United States Patent
Sano

(10) Patent No.: US 8,781,481 B2
(45) Date of Patent: Jul. 15, 2014

(54) COMMUNICATION APPARATUS, NETWORK APPARATUS, COMMUNICATION SYSTEM, COMMUNICATION METHOD, AND RECORDING MEDIUM

(75) Inventor: Shoichi Sano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 521 days.

(21) Appl. No.: 11/606,221

(22) Filed: Nov. 30, 2006

(65) Prior Publication Data

US 2008/0025273 A1  Jan. 31, 2008

(30) Foreign Application Priority Data

Jul. 31, 2006 (JP) ................................. 2006-208997

(51) Int. Cl.
| | |
|---|---|
| H04W 40/00 | (2009.01) |
| H04M 3/54 | (2006.01) |
| H04W 36/14 | (2009.01) |
| H04W 4/16 | (2009.01) |
| H04W 88/06 | (2009.01) |

(52) U.S. Cl.
CPC ............. *H04W 36/14* (2013.01); *H04W 4/16* (2013.01); *H04W 88/06* (2013.01); *H04M 3/54* (2013.01)
USPC ........ 455/445; 455/422.5; 455/448; 455/417; 455/418; 455/572; 370/328; 370/338; 379/211.01

(58) Field of Classification Search
USPC .................. 370/310, 328–338; 455/436, 401, 455/414.1, 417, 418, 422.1, 428, 448, 446, 455/445, 572; 324/600–727, 76.11–101
See application file for complete search history.

(56) References Cited

U.S. PATENT DOCUMENTS

| | | | |
|---|---|---|---|
| 5,826,191 A | | 10/1998 | Krishnan |
| 5,950,127 A | * | 9/1999 | Nitta et al. .................... 455/428 |

(Continued)

FOREIGN PATENT DOCUMENTS

| | | |
|---|---|---|
| DE | 19915548 A1 | 10/2000 |
| EP | 1040691 | 10/2000 |

(Continued)

OTHER PUBLICATIONS

Korean Office Action, document No. 035962; Application No. 9-5-2007-065818517; Feb. 4, 2008; 3-pages.

(Continued)

*Primary Examiner* — Quan M Hua
(74) *Attorney, Agent, or Firm* — Smith, Gambrell & Russell, LLP

(57) ABSTRACT

The present invention relates to a communication apparatus including a plurality of interfaces and the interfaces are selected to enable detour call reception. A power-supplied interface is allowed to receive a call correspondingly to the selection of the interface. A plurality of networks (cellular network, WLAN network) and a communicating apparatus (communication terminal apparatus) wirelessly connected to a network apparatus (cellular switchboard, SIP server) disposed in each network are included. The communicating apparatus includes a plurality of interface units (cellular interface unit, WLAN interface unit) corresponding to the networks. Connection of a power source is switched for the interface units, and some or all of the networks are notified of detour destination information for detouring the call from the network to the interface unit of the call destination. The network apparatus receives the detour destination information to detour the call to the interface unit of the detour destination.

5 Claims, 50 Drawing Sheets

(56) References Cited

U.S. PATENT DOCUMENTS

| | | | |
|---|---|---|---|
| 6,097,817 | A | 8/2000 | Bilgic et al. |
| 6,208,627 | B1 | 3/2001 | Menon et al. |
| 6,526,026 | B1 | 2/2003 | Menon et al. |
| 6,580,906 | B2 | 6/2003 | Bilgic et al. |
| 6,751,205 | B2 | 6/2004 | Menon et al. |
| 7,113,805 | B1 | 9/2006 | Schwarz |
| 2001/0036167 | A1 | 11/2001 | Menon et al. |
| 2002/0176581 | A1 | 11/2002 | Menon et al. |
| 2002/0196759 | A1 | 12/2002 | Yuhan et al. |
| 2003/0033522 | A1 | 2/2003 | Bilgic et al. |
| 2003/0137952 | A1 | 7/2003 | Menon |
| 2004/0002330 | A1 | 1/2004 | Chitrapu |
| 2004/0076177 | A1* | 4/2004 | Koch et al. ............... 370/465 |
| 2004/0174847 | A1 | 9/2004 | Menon et al. |
| 2004/0176129 | A1 | 9/2004 | Menon et al. |
| 2005/0096024 | A1* | 5/2005 | Bicker et al. .............. 455/417 |
| 2005/0233700 | A1* | 10/2005 | Pecen et al. ............ 455/67.11 |
| 2006/0002355 | A1* | 1/2006 | Baek et al. ............... 370/338 |
| 2006/0182089 | A1* | 8/2006 | Azuma ..................... 370/352 |
| 2008/0025273 | A1* | 1/2008 | Sano ....................... 370/338 |

FOREIGN PATENT DOCUMENTS

| | | |
|---|---|---|
| EP | 1527642 | 5/2005 |
| JP | 08154273 | 6/1996 |
| JP | 2002-501353 | 1/2002 |
| JP | 2004297121 | 10/2004 |
| JP | 2005-33707 | 2/2005 |
| JP | 2005080197 | 3/2005 |
| JP | 2005-531984 | 10/2005 |
| JP | 2006-50669 | 2/2006 |
| JP | 2006080706 | 3/2006 |
| KR | 1020040105318 A | 12/2004 |
| WO | WO 99/35865 | 7/1999 |
| WO | WO 2004/004187 A2 | 1/2004 |
| WO | WO 2004/004187 A3 | 1/2004 |

OTHER PUBLICATIONS

Extended European search report, Dec. 19, 2007, Application No. 06125059.3-1525, 7 pgs.
Korean Office Action dated Oct. 5, 2009 issued in Korean Patent Application No. 10-2008-20166.
First Notification of Office Action dated Mar. 18, 2010 received in corresponding Chinese Patent Application No. 200610171983.0.
European Office Action issued in corresponding European Patent Application No. 06125059.3 dated Nov. 26, 2010.
Extended European Search report issued in relevant European Patent Application No. 10174221.1-1525 dated Nov. 30, 2010.
Korean Office Action dated Jul. 31, 2008 issued in corresponding Korean Patent Application No. 10-2006-119183.
Korean Office Action dated Jun. 30, 2008 issued in corresponding Korean Patent Application No. 10-2008-20166.
Korean Office Action dated Jan. 28, 2009 issued in corresponding Korean Patent Application No. 10-2008-20166.
Japanese Office Action dated Mar. 22, 2011 for application No. 2006-208997.
Japanese Office Action dated Jan. 17, 2012 issued in corresponding Japanese Patent Application No. 2006-208997.
Japanese Office Action dated Nov. 20, 2012 issued in corresponding JP Patent Application No. 2006-208997.
Chinese Office Action dated Mar. 17, 2014 issued in corresponding Chinese Patent Application No. 200610171983.0.

* cited by examiner

FIG.9

CONNECTION MANAGEMENT TABLE 104 OF CELLULAR SWITCHBOARD 10

| TELEPHONE NUMBER | DETOUR SETTING |
|---|---|
|  |  |
| ×××-××××-×××× | YYY-YYYY-YYYY |
|  |  |
|  |  |

FIG.10

CONNECTION MANAGEMENT TABLE 106 OF SIP SERVER 14

| TELEPHONE NUMBER | IP ADDRESS | DETOUR SETTING |
|---|---|---|
|  |  |  |
| YYY-YYYY-YYYY | ZZ.ZZ.ZZ.ZZZ | ×××-××××-×××× |
|  |  |  |
|  |  |  |

FIG.14

CONNECTION MANAGEMENT TABLE 106 OF SIP SERVER 14

| TELEPHONE NUMBER | IP ADDRESS | DETOUR SETTING |
|---|---|---|
| 050-1111-0049 | 10.18.42.111 | INVALID |
| 050-1111-0050 | 10.18.42.50 | 090-2222-0050 |
| ............ | ............ | ............ |

FIG.20

CONNECTION MANAGEMENT TABLE 104 OF CELLULAR SWITCHBOARD 10

| TELEPHONE NUMBER | DETOUR SETTING |
|---|---|
| 090-2222-0049 | INVALID |
| 090-2222-0050 | 050-1111-0050 |
| ················ | ················ |

FIG.25

REPLACEMENT SETTING TABLE 108 OF CELLULAR SWITCHBOARD 10

| TELEPHONE NUMBER | REPLACEMENT SETTING |
|---|---|
|  |  |
|  |  |
| ⋮ | ⋮ |
|  |  |

FIG.26

REPLACEMENT SETTING TABLE 110 OF SIP SERVER 14

| TELEPHONE NUMBER | REPLACEMENT SETTING |
|---|---|
|  |  |
|  |  |
| ... | ... |
|  |  |

FIG.28

REPLACEMENT SETTING TABLE 108 OF CELLULAR SWITCHBOARD 10

| TELEPHONE NUMBER | REPLACEMENT SETTING |
|---|---|
| ............... | ................ |
| 050-1111-0050 | 090-2222-0050 |
| ⋮ | ⋮ |
| ................ | ................ |

FIG.32

REPLACEMENT SETTING TABLE 110 OF SIP SERVER 14

| TELEPHONE NUMBER | REPLACEMENT SETTING |
|---|---|
| ................. | ................. |
| 090-2222-0050 | 050-1111-0050 |
| ⋮ | ⋮ |
| ................. | ................. |

F I G. 40
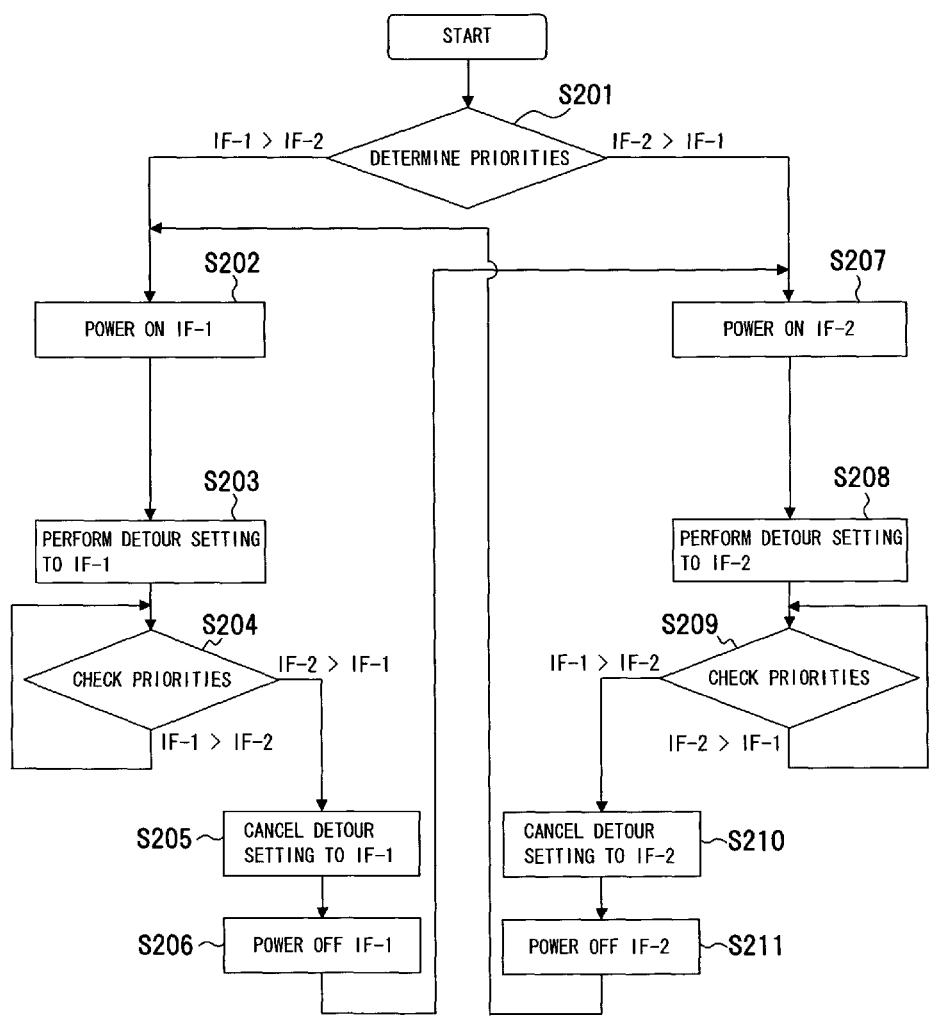

COMMUNICATION APPARATUS, NETWORK APPARATUS, COMMUNICATION SYSTEM, COMMUNICATION METHOD, AND RECORDING MEDIUM

CROSS-REFERENCE TO RELATED APPLICATIONS

This application is based upon and claims the benefit of priority from the prior Japanese Patent Application No. 2006-208997, filed on Jul. 31, 2006, the entire contents of which are incorporated herein by reference.

BACKGROUND OF THE INVENTION

1. Field of the Invention

The present invention relates generally to communication control depending on communication conditions, which includes a plurality of interfaces such as an interface supporting WLAN (Wireless Local Area Network) and an interface supporting a central network, and more particularly, to a communication apparatus, network apparatus, communication system, communication method communication program, and recording medium that select the interface for detour call reception.

2. Description of the Related Art

Among standards such as a cellular (cellular communication system) network and WLAN relating to mobile communication such as portable telephones, the cellular network includes, for example, CDMA (Code Division Multiple Access)-2000, W-CDMA (Wideband Code Division Multiple Access) and GSM (Global System for Mobile Communications), and the WLAN includes, for example, IEEE (Institute of Electrical and Electronic Engineers) 802.11g, WiMAX (Worldwide Interoperability for Microwave Access). A line interface is needed to support each network and a communication terminal apparatus supporting the both network needs two line interfaces. Therefore, the communication terminal apparatus with the line interfaces supporting the networks is referred to as a "DUAL terminal apparatus" for convenience.

With regard to the mobile communication across a plurality of networks such as the cellular network and WLAN, Published Japanese Translation of PCT Application No. 2002-501353 discloses a communication system that communicates using ground communication lines for short-distance calls and using a wireless access communication apparatus for long-distance calls (paragraph No. 0022 and FIG. 1). Japanese Patent Application Laid-Open Publication No. 2005-33707 discloses a communication system that can select a fixed mode for communicating only within a fixed zone, a mobile mode for communicating while moving, and a connection form such as a portable terminal communication network, PHS (Personal Handyphone System) communication network, and a cable communication network in response to information of the area where an excellent communication state for a communication terminal can be secured and information of communication that can secure the excellent communication state among a plurality of connection forms (abstract, FIG. 1). Published Japanese Translation of PCT Application No. 2005-531984 discloses that a portable telephone network can use the data signal connection between a WLAN and the portable telephone network to call a user device through a wireless channel of the WLAN if the user device is idle for a wireless telephone network and active for the WLAN and that the WLAN and the portable telephone network can use the data signal connection between the WLAN and the portable telephone network to call the user device if the user device is idle for the wireless telephone network and the WLAN (paragraph Nos. 0023, 0034, FIGS. 1, 4, and 7).

When a wireless communication apparatus is powered off in the communication system described in Published Japanese Translation of PCT Application No. 2002-501353, registration of subscriber identifiers is cancelled in a switchboard, and since registration in a center is also deleted because of powering off, an internal switchboard does not receive detour calls through PSTN (Public Switched Telephone Network). In Japanese Patent Application Laid-Open Publication No. 2005-33707, a terminal apparatus merely transmits a declaration signal indicating a connection form (mobile mode or fixed mode (local mode such as WLAN and fixed line)) and a network state is comprehended on the network side and supplied to the terminal apparatus. Published Japanese Translation of PCT Application No. 2005-531984 merely discloses that automatic transfer is performed to the connection setting side of the interface supporting the portable telephone network and WLAN.

By the way, wasteful power consumption is generated by supplying electric power to each interface of a communication apparatus including a plurality of interfaces and a battery life is greatly affected in the case of a portable device powered by a battery. Although cutting off power to inactive interfaces contributes to suppression of power consumption and increase of the battery life in the case of a portable device, if power supply to inactive interfaces is stopped, communication cannot be performed through the interfaces and a degree of freedom of communication is hindered.

In the case of wireless communication, the field intensity affects communication quality and if the field intensity is insufficient, communication becomes impossible. In a communication apparatus including a plurality of interfaces supporting a plurality of networks such as the cellular network and WLAN, a network can be selected depending on the field intensity, and communication breakdown due to reduction of the field intensity can advantageously be avoided.

Communication conditions such as usage fees are different in a plurality of networks such as the cellular network and WLAN, which gives users a degree of freedom of selection as needed.

In association with the power supply cutoff, field intensity, and communication conditions of such interfaces, it is desirable to achieve a convenient communication environment without deteriorating a degree of freedom of communication. Published Japanese Translation of PCT Application Nos. 2002-501353, 2005-531984, and Japanese Patent Application Laid-Open Publication No. 2005-33707 do not disclose and indicate such problems and do not disclose and indicate the solutions thereof.

SUMMARY OF THE INVENTION

An object of the present invention relates to a communication apparatus including a plurality of interfaces for supporting a plurality of networks and is to select interfaces to enable detour call reception.

Another object of the present invention relates to a communication apparatus including a plurality of interfaces for supporting a plurality of networks and is to allow a power-supplied interface to receive a call correspondingly to the selection of the interface.

To achieve the objects, in the present invention, a plurality of interface units wirelessly connected to a plurality of networks is included for transmission to and reception from the networks and a certain interface unit is selected from the interface units, that is, power supply connection to the interface units is switched to operate the certain interface unit. Correspondingly to the selection of the interface unit, networks are notified of a change in the destination interface unit and the call destination is switched to the interface unit connected to a power source to enable the call reception. The selection of the interface unit may be performed in accordance with fees of the networks or field intensity (radio field intensity) of the interface units or may be set in accordance with priorities established by a user. Battery consumption can be suppressed by selectively supplying power to the interface units and, since the network is selected by selecting the interface unit depending on the fees, the economical efficiency of the communication is also enhanced.

To achieve the objects, a first aspect of the present invention provides a communication apparatus wirelessly connected to a plurality of networks to transmit/receive a call to/from each network, the apparatus comprising a plurality of interface units corresponding to the networks; a controlling unit that selects the interface unit of a call destination for the network, the controlling unit switching connection of a power source for the interface units; and a notifying unit that notifies some or all of the networks of detour destination information for detouring the call from the network to the interface unit of the call destination, the apparatus transferring the call in the network to the interface unit of the detour destination. According to such a configuration, the objects can be achieved.

To achieve the objects, in the communication apparatus, preferably, the controlling unit selects the interface unit of the call destination in accordance with field intensity. According to such a configuration, the objects can be achieved.

To achieve the objects, in the communication apparatus, preferably, the controlling unit selects the interface unit of the call destination in accordance with priorities set in advance or as needed. According to such a configuration, the objects can be achieved.

To achieve the objects, in the communication apparatus, preferably, the interface unit includes a transmitting/receiving unit that transmits and receives electric waves and an information processing unit that processes call transmission/reception information for the transmitting/receiving unit, and connection of a power source is switched for the information processing unit. According to such a configuration, the objects can be achieved.

To achieve the objects, a second aspect of the present invention provides a network apparatus disposed in a network wirelessly connected to a communication apparatus including a plurality of interface units, the apparatus comprising a processing unit that receives notification of detour destination information for detouring a call from the network to the interface unit of the call destination to detour the call to the interface unit selected as the detour destination. According to such a configuration, the objects can be achieved.

To achieve the objects, the network apparatus may comprise a storing unit that stores the detour destination information. In the network apparatus, the processing unit may receive the detour destination information from the communication apparatus. In the network apparatus, the processing unit may receive the detour destination information via another network. The network apparatus may comprise a communicating unit that transfers the detour destination information to another network.

To achieve the objects, a third aspect of the present invention provides a communication system comprising a plurality of networks and a communicating apparatus wirelessly connected to a network apparatus disposed in each network, the communicating apparatus including a plurality of interface units corresponding to the networks, the communicating apparatus selecting the interface unit of a call destination for the network, the communicating apparatus switching connection of a power source for the interface units, the communicating apparatus notifying some or all of the networks of detour destination information for detouring the call from the network to the interface unit of the call destination, the network apparatus receiving the detour destination information to detour the call to the interface unit of the detour destination in the communication apparatus. According to such a configuration, the objects can be achieved.

To achieve the objects, a fourth aspect of the present invention provides a communicating method of wirelessly connecting a plurality of networks to transmit/receive a call to/from each network, the method comprising the steps of selecting a plurality of interface units corresponding to the networks and switching connection of a power source for the interface units; notifying some or all of the networks of detour destination information for detouring the call from the network to the interface unit of the call destination; and transferring the call in the network to the interface unit of the detour destination. According to such a configuration, the objects can be achieved.

To achieve the objects, the communicating method may comprise the step of selecting the interface unit of the call destination in accordance with field intensity. The communicating method may comprise the step of selecting the interface unit of the call destination in accordance with priorities set in advance or as needed.

To achieve the objects, a fifth aspect of the present invention provides a communicating method of wirelessly connecting a plurality of interface units of a communication apparatus to transmit/receive a call, the method comprising the steps of receiving notification of detour destination information for detouring a call from a network to the interface unit of a call destination and detouring the call to the interface unit selected as the detour destination. According to such a configuration, the objects can be achieved.

To achieve the objects, the communicating method may comprise the step of storing the detour destination information in a storing unit. The communicating method may comprise the step of receiving the detour destination information from the communication apparatus. The communicating method may comprise the step of receiving the detour destination information via another network. The communicating method may comprise the step of transferring the detour destination information to another network.

To achieve the objects, a sixth aspect of the present invention provides a communication program executed by a computer, the program comprising the steps of selecting a plurality of interface units corresponding to a plurality of networks and switching connection of a power source for the interface units; notifying some or all of the networks of detour destination information for detouring the call from the network to the interface unit of the call destination; and transferring the call in the network to the interface unit of the detour destination. According to such a configuration, the objects can be achieved.

To achieve the objects, a seventh aspect of the present invention provides a communication program executed by a computer, the program comprising the steps of receiving notification of detour destination information for detouring a call from a network to an interface unit of a call destination among a plurality of interface units in a communication apparatus and detouring the call to the interface unit selected as the detour destination. According to such a configuration, the objects can be achieved.

To achieve the objects, the communication program may comprise the step of transferring the detour destination information to another network. The communication program may comprise the step of storing the detour destination information in a storing unit.

To achieve the objects, an eighth aspect of the present invention provides a computer readable recording medium storing a communication program, the recording medium storing the communication program executed by a computer, the program comprising the steps of selecting a plurality of interface units corresponding to a plurality of networks and switching connection of a power source for the interface units; notifying some or all of the networks of detour destination information for detouring the call from the network to the interface unit of the call destination; and transferring the call in the network to the interface unit of the detour destination.

To achieve the objects, an ninth aspect of the present invention provides a computer readable recording medium storing a communication program, the recording medium storing the communication program executed by a computer, the program comprising the steps of: receiving notification of detour destination information for detouring a call from a network to an interface unit of a call destination among a plurality of interface units in a communication apparatus; and detouring the call to the interface unit selected as the detour destination.

To achieve the objects, in the computer readable recording medium storing a communication program, the program may comprise the step of transferring the detour destination information to another network. The program may comprise the step of storing the detour destination information in a storing unit.

The features and advantages of the present invention are listed as follows.

(1) By selecting a plurality of interface units and switching connection of a power source to the interface units, power saving can be achieved and a call destination is detoured to maintain connection necessary for communication, therefore call reception can be prevented from becoming impossible due to the selection of the interface unit to maintain the reliability of the communication.

(2) Since the network can be selected by the interface unit, the selection conditions such as the priority selection of field intensity and fee conditions can be supported to make a contribution to the maintenance of the communication reliability and the improvement in the economical efficiency.

(3) The selection of the interface unit can be automated.

Other objects, features, and advantages of the present invention will become more apparent by reference to the accompanying drawings and each embodiment.

BRIEF DESCRIPTION OF THE DRAWINGS

FIG. 9 depicts an example of a connection management table of the cellular switchboard;
FIG. 10 depicts an example of a connection management table of the SIP server;
FIG. 14 depicts a specific example of the connection management table of the SIP server;
FIG. 20 depicts a specific example of the connection management table of the cellular switchboard;
FIG. 25 depicts an example of a replacement setting table of the cellular switchboard according to a second embodiment;
FIG. 26 depicts an example of a replacement setting table of the SIP server according to the second embodiment;
FIG. 28 depicts a specific example of the replacement setting table of the cellular switchboard;
FIG. 32 depicts a specific example of the replacement setting table of the SIP server.

FIG. 40 is a flowchart of a process procedure of the communication terminal apparatus in a communication system according to a fifth embodiment;

DETAILED DESCRIPTION OF THE PREFERRED EMBODIMENTS

First Embodiment

Figure 1:
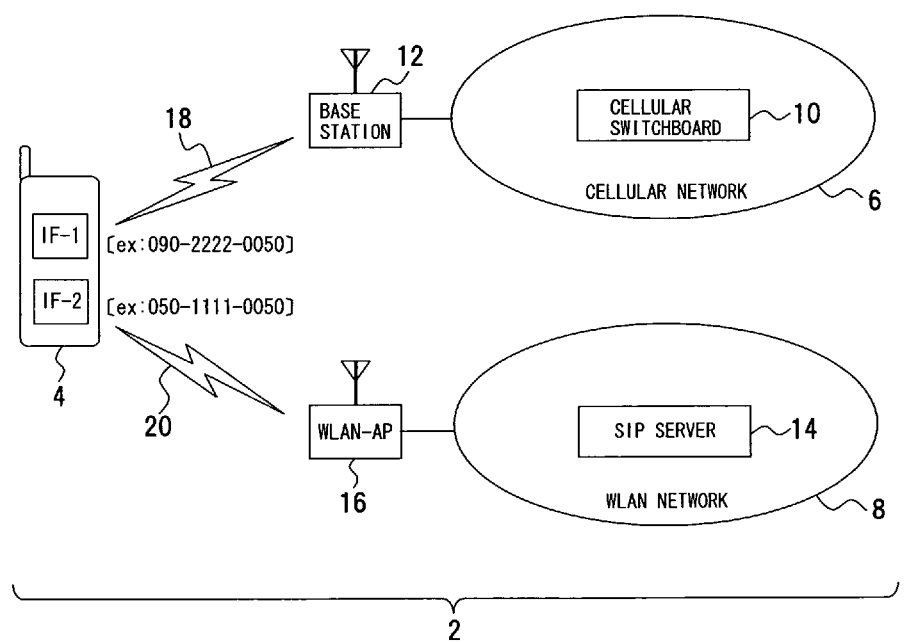
FIG. 1 depicts a communication system according to a first embodiment.
Figure 2:
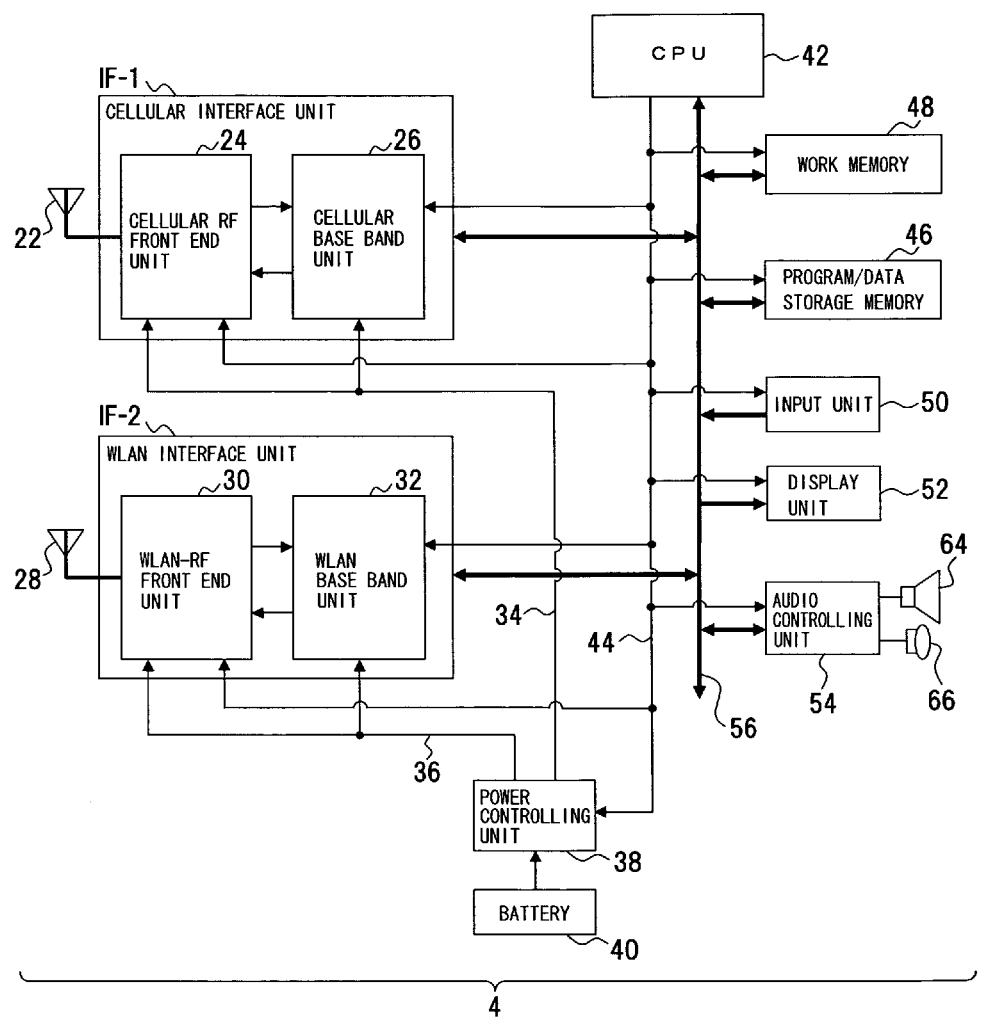
FIG. 2 depicts an example of a communication terminal apparatus.
Figure 3:
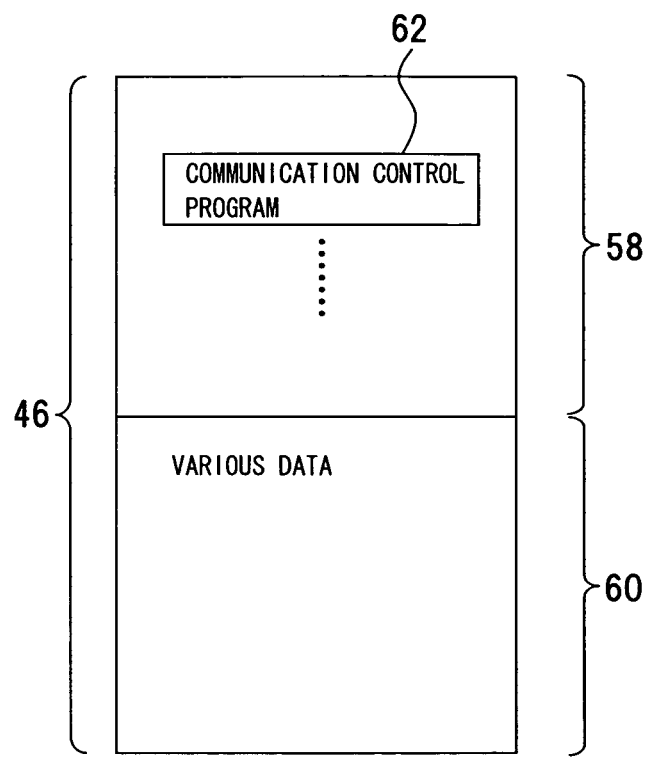
FIG. 3 depicts a configuration example of a program/data storage memory.
Figure 4:
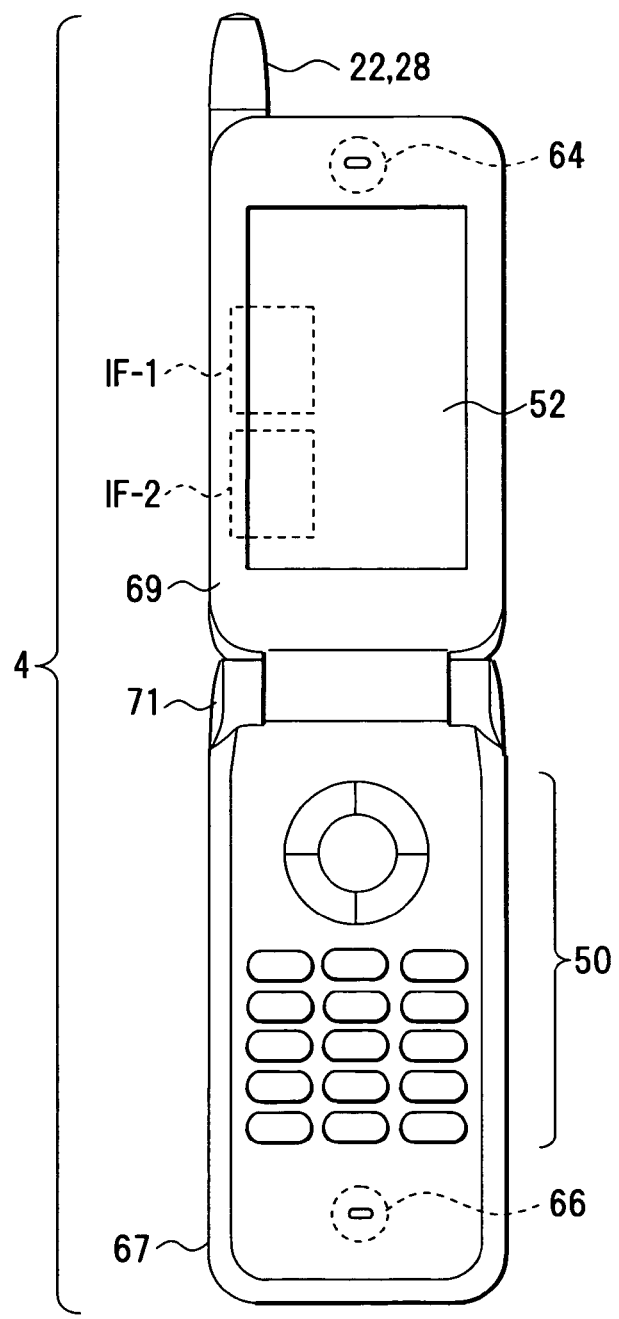
FIG. 4 depicts an example of the communication terminal apparatus.
Figure 5:
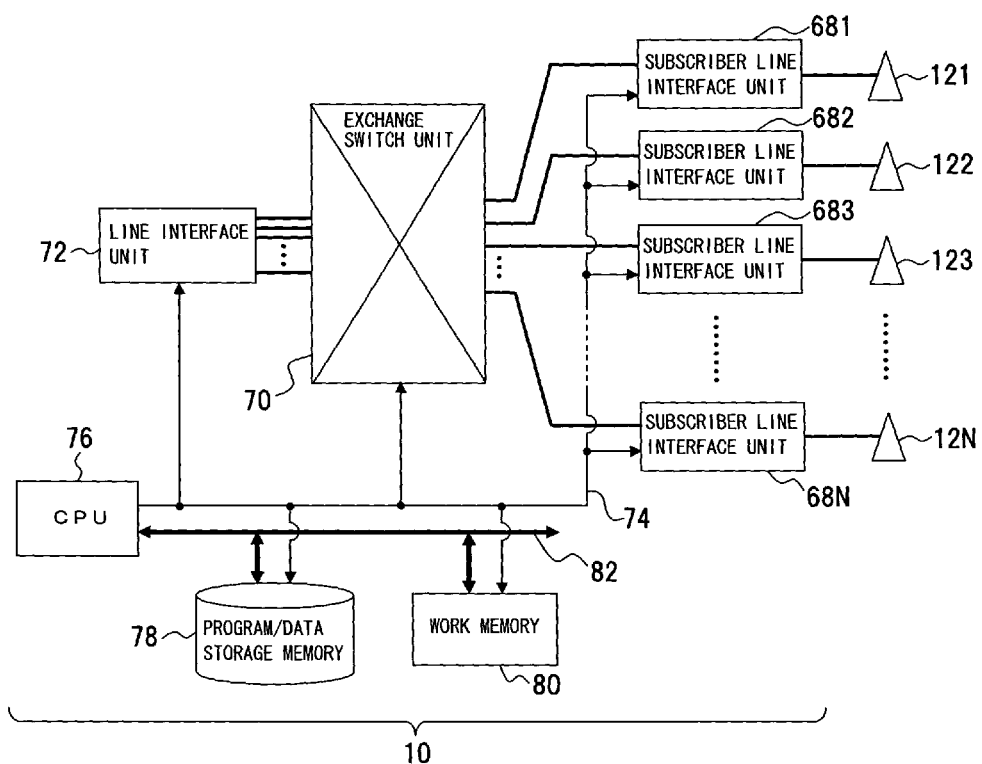
FIG. 5 depicts an example of a cellular switchboard.
Figure 6:
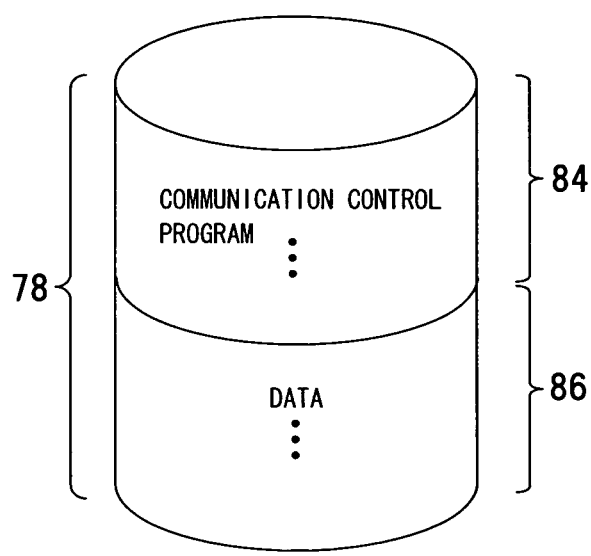
FIG. 6 depicts a configuration example of the program/data storage memory.
Figure 7:
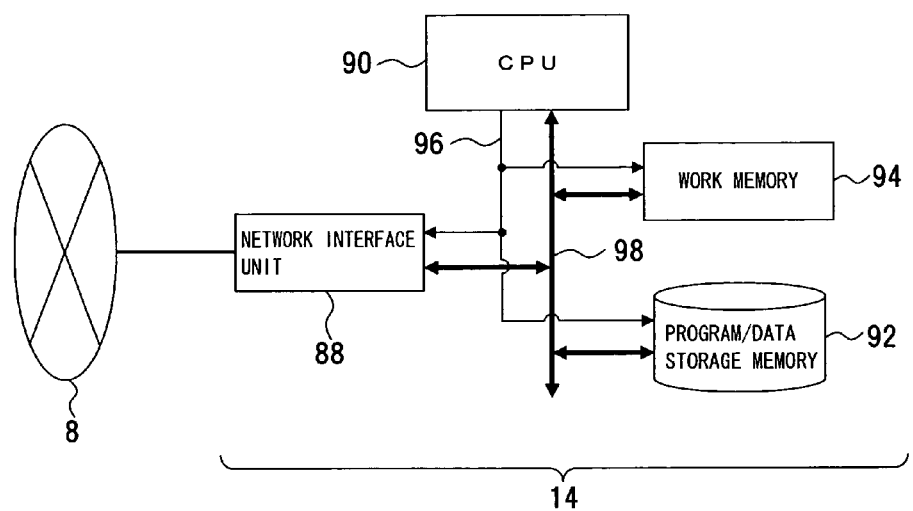
FIG. 7 depicts an example of an SIP server.
Figure 8:
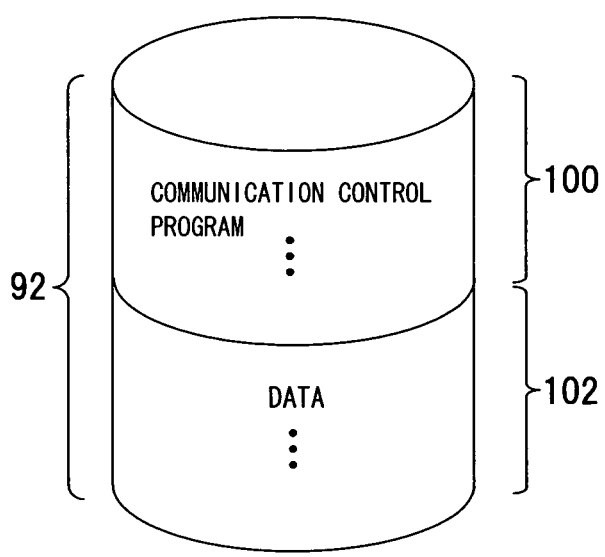
FIG. 8 depicts a configuration example of the program/data storage memory.

A first embodiment of the present invention will be described with reference to FIGS. 1 to 10. FIG. 1 depicts a communication system to which the present invention is applied; FIG. 2 depicts an example of a communication terminal apparatus; FIG. 3 depicts a configuration example of a program/data storage memory; FIG. 4 depicts an example of the communication terminal apparatus; FIG. 5 depicts an example of a cellular switchboard; FIG. 6 depicts a configuration example of the program/data storage memory; FIG. 7 depicts an example of an SIP server; FIG. 8 depicts a configuration example of the program/data storage memory; FIG. 9 depicts a connection management table of the cellular switchboard; and FIG. 10 depicts a connection management table of the SIP server.

As shown in FIG. 1, this communication system 2 configures a system that can use a communication terminal apparatus 4 as a communication apparatus to communicate through a plurality of communication lines (networks), for example, a cellular network 6 or the internet, i.e., a wireless LAN (Wireless Local Area Network) 8 (hereinafter, "WLAN network 8").

The cellular network 6 includes a cellular switchboard 10 and a base station 12 and the WLAN network 8 includes an SIP server 14 and a wireless LAN access point 16 (hereinafter, "WLAN-AP 16"). The communication terminal apparatus 4 is connected to the cellular switchboard 10 via the base station 12 through cellular electric wave 18 and is connected to the WLAN-AP 16, i.e., a relay station, through the intermediation of WLAN electric wave 20. That is, the cellular switchboard 10 configures a network apparatus of the cellular network 6 for the communication terminal apparatus 4 and the SIP server 14 configures a network apparatus of the WLAN network 8 for the communication terminal apparatus 4.

In this communication system 2, the communication terminal apparatus 4 includes a cellular interface unit IF-1 supporting the cellular network 6 and a WLAN interface unit IF-2 supporting the WLAN network 8. The cellular interface unit IF-1 and the WLAN interface unit IF-2 are notifying units for the networks that can achieve power saving through operational selection depending on selection conditions such as fees and field intensity (radio field intensity), and configure a system that allows an incoming call (so-called call-in) during suspension of operation to detour to the operation maintaining side to enable communication. In this case, for example, it is assumed that a cellular telephone number "090-2222-0050" and a WLAN telephone number "050-1111-0050" are assigned to the cellular interface unit IF-1 and the WLAN interface unit IF-2, respectively. The communication system 2 including the communication terminal apparatus 4 includes the following configuration, control, process, etc.

(1) Any operation is selected for the cellular interface unit IF-1 and the WLAN interface unit IF-2 of the communication terminal apparatus 4 depending on connection priorities, for example, fees and field intensity and the operation is selected by switching a power source.

(2) When switching the power source, the communication terminal apparatus 4 notifies the cellular network 6 and/or the WLAN network 8 and instructs to perform detour setting process.

(3) The cellular network 6 and/or the WLAN network 8 perform the detour setting process and controls the cellular interface unit IF-1 and WLAN interface unit IF-2 such that incoming calls to the powered-off side can be detoured to perform communication.

Therefore, as shown in FIG. 2, the cellular interface unit IF-1 and the WLAN interface unit IF-2 are included in the communication terminal apparatus 4, and the cellular interface unit IF-1 is a functioning unit for supporting the base station 12 connected to the cellular switchboard 10 and includes an antenna 22, a cellular RF (Radio Frequency) front end unit 24, and a cellular base band unit 26.

The WLAN interface unit IF-2 is a functioning unit for supporting the WLAN-AP 16 of the SIP server 14 and includes an antenna 28, a WLAN-RF front end unit 30, and a WLAN base band unit 32. The cellular interface unit IF-1 and the WLAN interface unit IF-2 operates independently; the interface units IF-1, IF-2 are connected to a battery 40 through power supply lines 34, 36 and a common power controlling unit 38; and the power supply from the battery 40 is controlled by the power controlling unit 38. Specifically, the power controlling unit 38 includes a power supply switching function and selects the power supply to the cellular interface unit IF-1 and the WLAN interface unit IF-2 as needed. The cellular interface unit IF-1, the WLAN interface unit IF-2, and the power controlling unit 38 are controlled by a controlling means disposed on the communication terminal apparatus 4, i.e., by execution of a communication control program 62 (FIG. 3) with a computer.

The interface units IF-1, IF-2 and the power controlling unit 38 are connected through a control line 44 to a CPU (Central Processing Unit) 42 acting as a controlling unit or an information processing unit that performs power supply control, communication control, field intensity determination, control for the field intensity determination, and other control, and the CPU 42 is connected to a program/data storage memory 46, a work memory 48, an input unit 50, a displaying unit 52, and an audio controlling unit 54 through the control line 44 and a data bus 56. The program/data storage memory 46 consists of a recording medium such as a ROM (Read-Only Memory); for example, as shown in FIG. 3, a program storage area 58 and a data storage area 60 are established on this program/data storage memory 46; the program storage area 58 stores programs such as a communication control program 62; and the data storage area 60 stores various data. The work memory 48 consists of a RAM (Random-Access Memory) and is used as a work area.

The input unit 50 is controlled by the CPU 42, is an input means of various pieces of information for the CPU 42, and includes a keyboard, for example. The displaying unit 52 displays various pieces of information such as communication destinations, selection information of the selected interface units IF-1, IF-2, and mail information under the control of the CPU 42. The audio controlling unit 54 transmits and receives voices on the phone under the control of the CPU 42. Therefore, the audio controlling unit 54 is connected to a speaker 64 that reproduces and outputs received signals as voices and a microphone 66 that inputs and converts transmitted voices into electric signals.

With regard to the field intensity of the cellular interface unit IF-1 and the WLAN interface unit IF-2 in the communication terminal apparatus 4, received electric waves are monitored in the cellular interface unit IF-1 and the WLAN interface unit IF-2 during phone calls, or the power source is periodically connected to the cellular interface unit IF-1 and the WLAN interface unit IF-2 during suspension to monitor the received electric waves. The received field intensity is compared with a reference level enabling communication and if the field intensity exceeds the reference level, it is determined that communication can be performed. This process is executed by the communication control program 62.

As shown in FIG. 4, the communication terminal apparatus 4 includes housings 67, 69 that can be folded at a hinge unit 71; the housing 67 includes the input unit 50 including cursor keys and character keys and the microphone 66; and the housing 69 includes the antennas 22, 28, the displaying unit 52 including, for example, an LCD (Liquid Crystal Display), the speaker 64, etc. The displaying unit 52 displays a power source connection state, etc., of the cellular interface unit IF-1 and the WLAN interface unit IF-2 at the start of or during a phone call. If the power source connection is manually switched, the display unit 52 displays dialogues or details of a setting instruction.

As shown in FIG. 5, the cellular switchboard 10 includes base stations 12₁, 12₂, 12₃ . . . 12N and subscriber line interface units 68₁, 68₂, 68₃ . . . 68N corresponding to a plurality of communication terminals along with the communication terminal apparatus 4; the subscriber line interface units 68₁, 68₂, 68₃ . . . 68N are connected to an exchange switching unit 70; and the exchange switching unit 70 is connected to a line interface unit 72. The exchange switching unit 70 selects the line interface unit 72 depending on incoming calls to connect communication destinations. The line interface unit 72 accepts call-in signals from lines and transmits the signals to the exchange switching unit 70.

The subscriber line interface units 68₁, 68₂, 68₃ . . . 68N, the exchange switching unit 70, and the line interface unit 72 are connected through a control line 74 to a computer, i.e., a controlling means that includes a CPU 76, a program/data storage memory 78, a work memory 80, etc., and the CPU 76, the program/data storage memory 78, and the work memory 80 are connected with a data bus 82. The CPU 76 is a controlling unit and an information processing unit, executes programs stored in the program/data storage memory 78, controls the subscriber line interface units 68₁, 68₂, . . . 68N, the exchange switching unit 70, and the line interface unit 72, receives the notification of the switch instruction from the call reception process and the communication terminal apparatus 4, and stores the contents of the notification in the program/data storage memory 78, and executes the communication control triggered by the call reception, such as execution of the contents of the notification of the switch instruction. As shown in FIG. 6, the program/data storage memory 78 includes a program storage area 84 and a data storage area 86, and the program storage area 84 stores a communication control program corresponding to the communication control program 62. The work memory 80 consists of a RAM and is used as a work area.

As shown in FIG. 7, the SIP server 14 includes a network interface unit 88 connected to the WLAN network 8 and the network interface unit 88 is connected through a control line 96 and a data bus 98 to a CPU 90, a program/data storage memory 92, and a work memory 94 of a computer as a controlling unit or information processing unit. As shown in FIG. 8, the program/data storage memory 92 includes a program storage area 100 and a data storage area 102, and the program storage area 100 stores a communication control program corresponding to the communication control program 62. The work memory 94 consists of a RAM and is used as a work area.

The setting of the cellular switchboard 10 of the cellular network 6 and the SIP server 14 of the WLAN network 8 will be described with reference to FIGS. 9 and 10. FIG. 9 depicts a configuration example of a connection management table of the cellular switchboard and FIG. 10 depicts a configuration example of a connection management table of the SIP server.

A connection management table 104 shown in FIG. 9 is established in the data storage area 86 (FIG. 6) of the program/data storage memory 78 of the cellular switchboard 10. The connection management table 104 is a means that manages a telephone number serving as information representing a detour setting destination of a telephone number that is a call destination, and the connection management table 104 includes telephone number fields that store connection target telephone numbers and detour setting fields that store telephone numbers of detour destinations corresponding to the connection targets. With regard to the availability of the detour setting, the detour setting is enabled when a telephone number is stored in the detour setting field. The detour setting is disabled when invalidity is stored in the detour setting field.

A connection management table 106 shown in FIG. 10 is established in the data storage area 102 (FIG. 8) of the program/data storage memory 92 of the SIP server 14. In the SIP server 14, the connection management table 106 is a means that manages a telephone number serving as information representing a detour setting destination of a telephone number that is a call destination, and the connection management table 106 includes telephone number fields that store target telephone numbers, IP address fields corresponding to the telephone numbers, and detour setting fields corresponding to the telephone numbers. As is the case with the cellular switchboard 10, with regard to the availability of the detour setting, the detour setting is enabled when a telephone number is stored in the detour setting field. The detour setting is disabled when invalidity is stored in the detour setting field.

Figure 11:
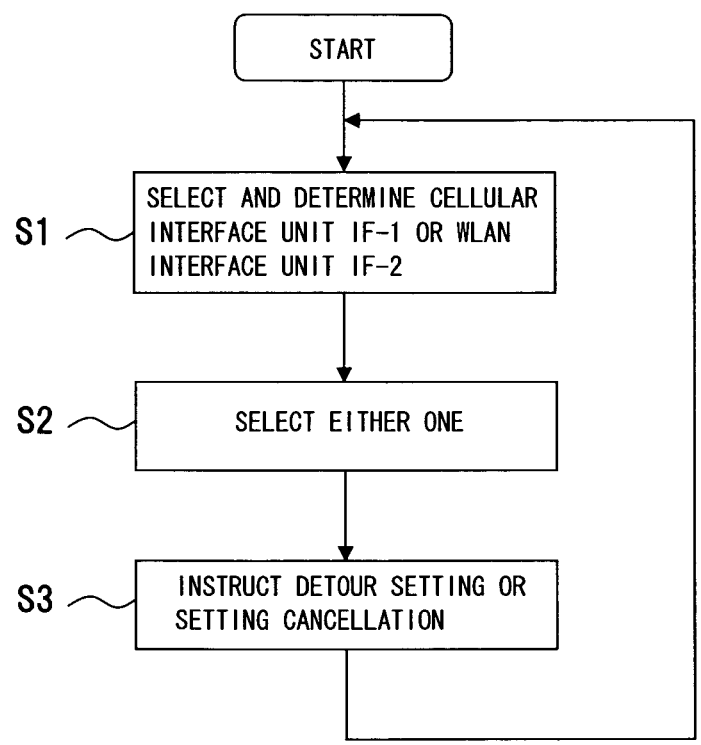
FIG. 11 is a flowchart of a process procedure of the communication terminal apparatus.

With regard to a communicating method of the present invention, a process procedure of the communication terminal apparatus will be described with reference to FIG. 11. FIG. 11 is a flowchart of an overview of a process procedure in the communication terminal apparatus 4.

This communicating method is executed by the computer and the communication control program 62 disposed on the communication terminal apparatus 4, and the process procedure includes determining selection of, selecting, and instructing detour setting or setting cancellation of the interface units, etc.

(1) Determining Selection of Cellular Interface Unit IF-1 and WLAN Interface Unit IF-2

As shown in FIG. 11, the communication terminal apparatus 4 determines which one of the cellular interface unit IF-1 and the WLAN interface unit IF-2 is operated and which one is suspended, specifically, which one is disconnected from the power source and which one is connected to the power source (step S1). In this case, at the start of the operation of the communication terminal apparatus 4, one interface unit may be prioritized and the connection priorities may be changed depending on conditions such as the field intensity and fees.

(2) Selecting Cellular Interface Unit IF-1 and WLAN Interface Unit IF-2

Based on this determination, one of the cellular interface unit IF-1 and the WLAN interface unit IF-2 is selected (step S2). When the cellular interface unit IF-1 or the WLAN interface unit IF-2 is selected, if communication cannot be performed due to the low field intensity, the WLAN interface unit IF-2 is selected instead of the cellular interface unit IF-1, or the cellular interface unit IF-1 is selected instead of the WLAN interface unit IF-2.

(3) Instructing Detour Setting or Setting Cancellation of Cellular Interface Unit IF-1 and WLAN Interface Unit IF-2

With the above selection result, the detour setting or setting cancellation is instructed from the cellular interface unit IF-1 or the WLAN interface unit IF-2 to the cellular switchboard 10 or the SIP server 14 (step S3).

With regard to the detour setting, if the WLAN interface unit IF-2 is the target of the power-off, the WLAN interface unit IF-2 notifies the SIP server 14 and instructs the detour setting before the power-off. The instruction of the detour setting for the SIP server 14 is an instruction of detouring calls for the WLAN interface unit IF-2 from the SIP server 14 through the cellular switchboard 10 to the power-supplied cellular interface unit IF-1, and a detour destination is enabled by registering a telephone number serving as the detour destination for a telephone number in the connection management table 106 (FIG. 10) of the SIP server 14.

If the cellular interface unit IF-1 is the target of the power-off, the cellular interface unit IF-1 notifies the cellular switchboard 10 and instructs the detour setting before the power-off. The instruction of the detour setting for the cellular switchboard 10 is an instruction of detouring calls for the cellular interface unit IF-1 from the cellular switchboard 10 through the SIP server 14 to the power-supplied WLAN interface unit IF-2, and a detour destination is enabled by registering a telephone number serving as the detour destination for a telephone number in the connection management table 104 (FIG. 9) of the cellular switchboard 10.

The cancellation of the detour setting is on the premise of the presence of the detour setting. The current detour setting state is used to instruct the cancellation of the detour setting from the cellular interface unit IF-1 or the WLAN interface unit IF-2 to the cellular switchboard 10 or the SIP server 14.

If the WLAN interface unit IF-2 is powered off, the cancellation instruction of the detour setting for the SIP server 14 is an instruction executed from the cellular interface unit IF-1 through the cellular switchboard 10, and the detour destination telephone number is erased or invalidity is stored for the telephone number in the connection management table 104 (FIG. 9) of the cellular switchboard 10. This results in the cancellation of the detour setting.

If the cellular interface unit IF-1 is powered off, the cancellation instruction of the detour setting for the cellular switchboard 10 is an instruction executed from the WLAN interface unit IF-2 through the SIP server 14, and the detour destination telephone number is erased or invalidity is stored for the telephone number in the connection management table 106 (FIG. 10) of the SIP server 14. This results in the cancellation of the detour setting.

Figure 12:
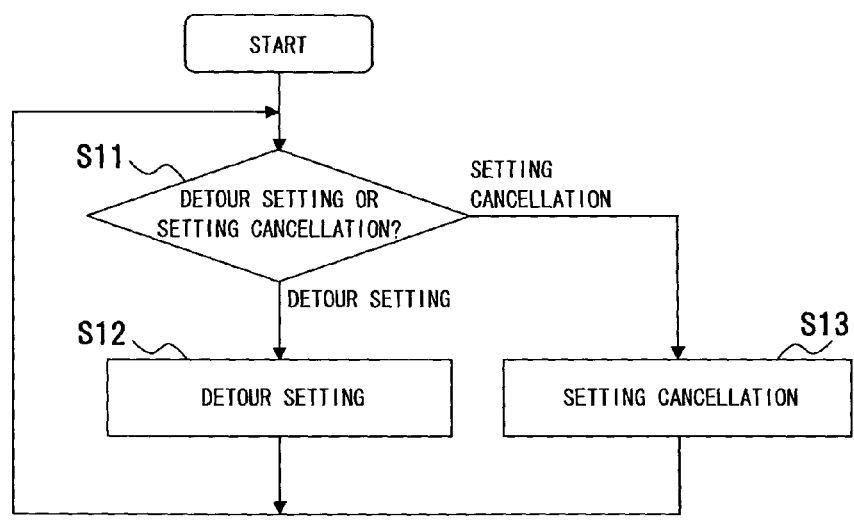
FIG. 12 is a flowchart of a process procedure of the cellular switchboard and the SIP server.

A process procedure of the communicating method of the cellular switchboard or SIP server will be described with reference to FIG. 12. FIG. 12 is a flowchart of an overview of a process procedure of the cellular switchboard 10 or the SIP server 14.

This communicating method is executed by the computer and the communication control program 62 disposed on the cellular switchboard 10 or the SIP server 14, and the process procedure includes determining whether the detour setting or the setting cancellation, instructing the detour setting or the setting cancellation, etc.

(1) Determining Detour Setting or Setting Cancellation

With the instruction from the communication terminal apparatus 4, it is determined for the cellular switchboard 10 or the SIP server 14 whether the detour setting or the setting cancellation (step S11).

(2) Processing Detour Setting or Setting Cancellation

In the case of the detouring setting, the detouring setting is performed (step S12) and in the case of the setting cancellation, the setting cancellation is performed (step S13).

In response to the detour setting instruction from the WLAN interface unit IF-2, the SIP server 14 performs the setting of detouring calls for the WLAN interface unit IF-2 from the SIP server 14 through the cellular switchboard 10 to the power-supplied cellular interface unit IF-1.

In response to the detour setting instruction from the cellular interface unit IF-1, the cellular switchboard 10 performs the setting of detouring calls for the cellular interface unit IF-1 from the cellular switchboard 10 through the SIP server 14 to the power-supplied WLAN interface unit IF-2.

With regard to the cancellation of the detour setting for the SIP server, the instruction from the cellular interface unit IF-1 is received by the SIP server 14 through the cellular switchboard 10 and is performed by the SIP server 14.

With regard to the cancellation of the detour setting for the cellular switchboard 10, the instruction from the WLAN interface unit IF-2 is received by the cellular switchboard 10 through the SIP server 14 and is performed by the cellular switchboard 10.

Figure 13:
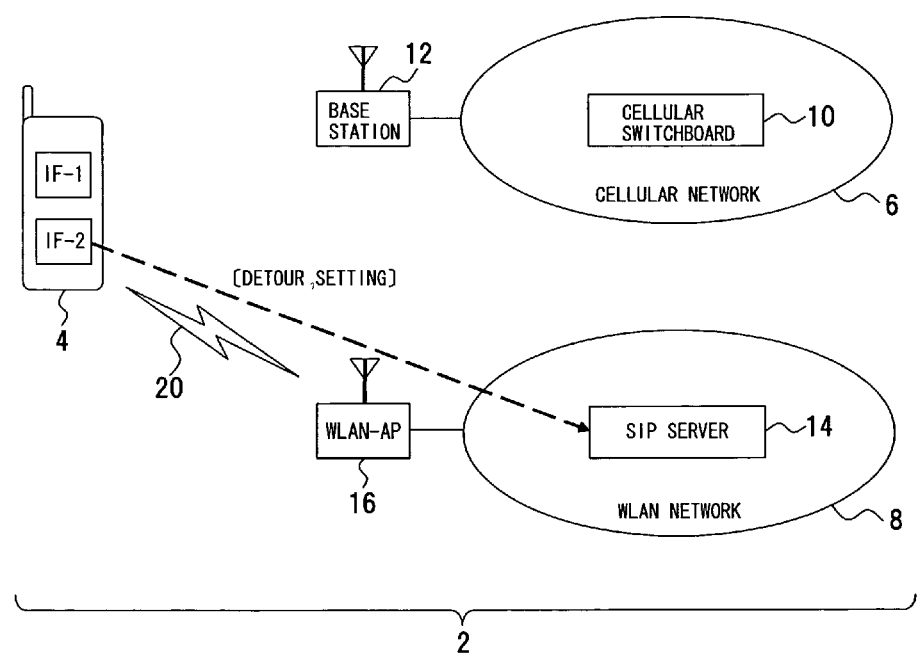
FIG. 13 depicts detour setting of the SIP server (in the case of powering off IF-2)
Figure 15:
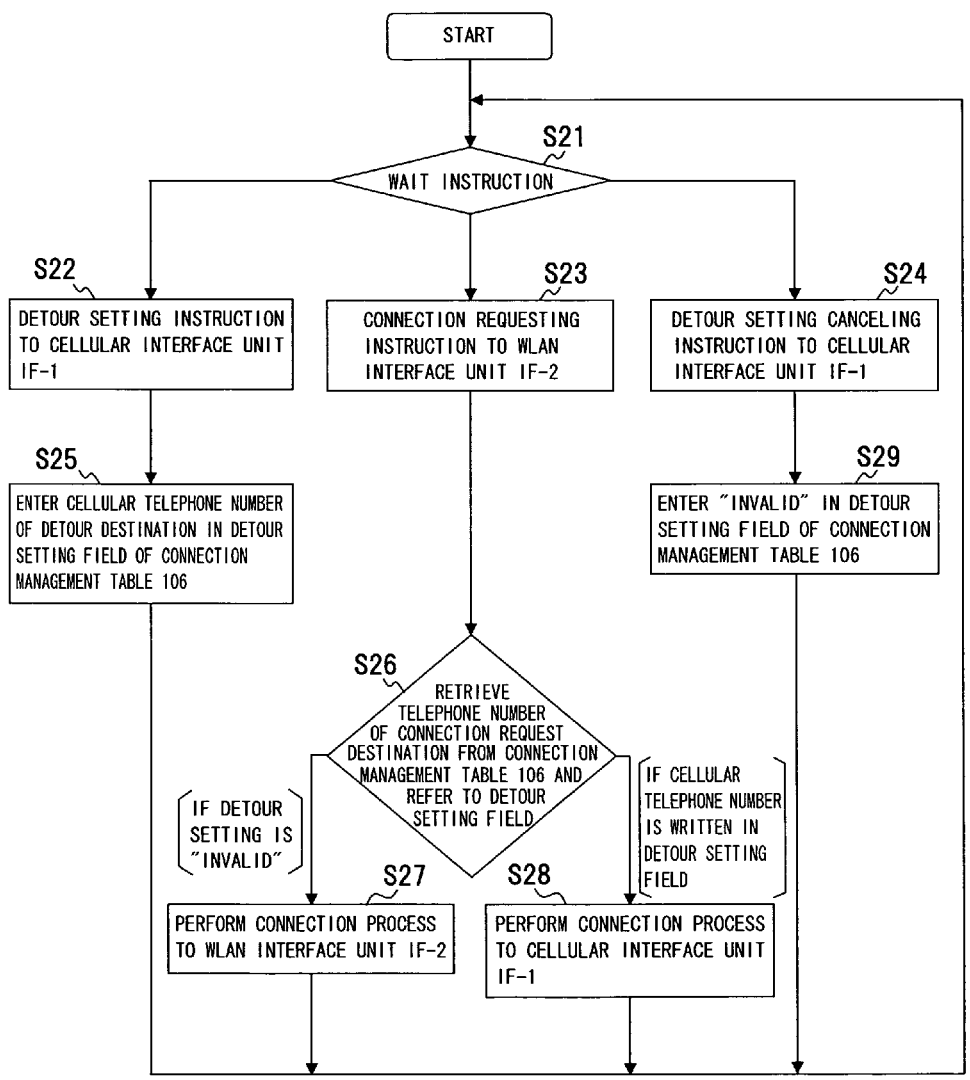
FIG. 15 is a flowchart of a process procedure of the SIP server (in the case of powering off IF-2)
Figure 16:
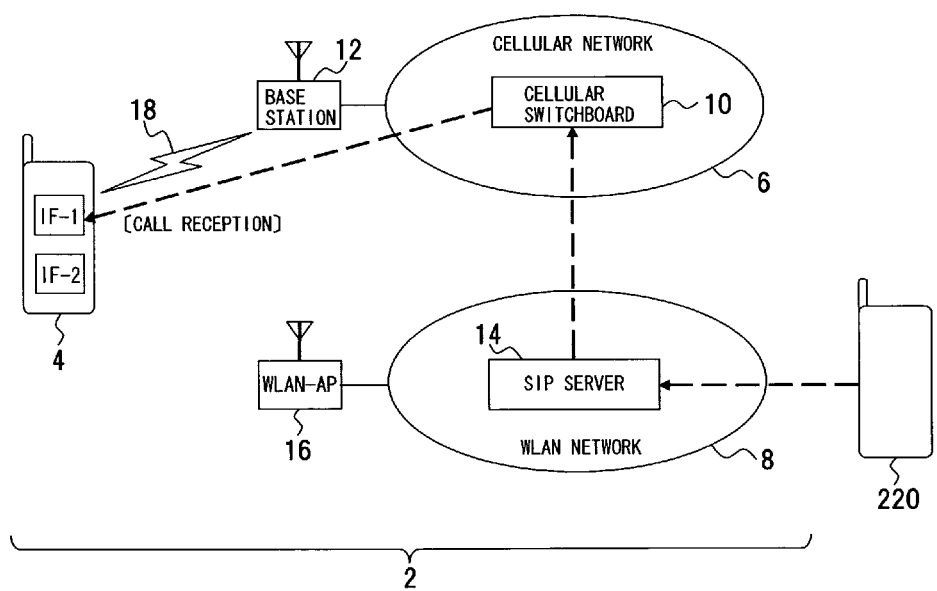
FIG. 16 depicts detour call reception of IF-1 of the communication terminal apparatus.
Figure 17:
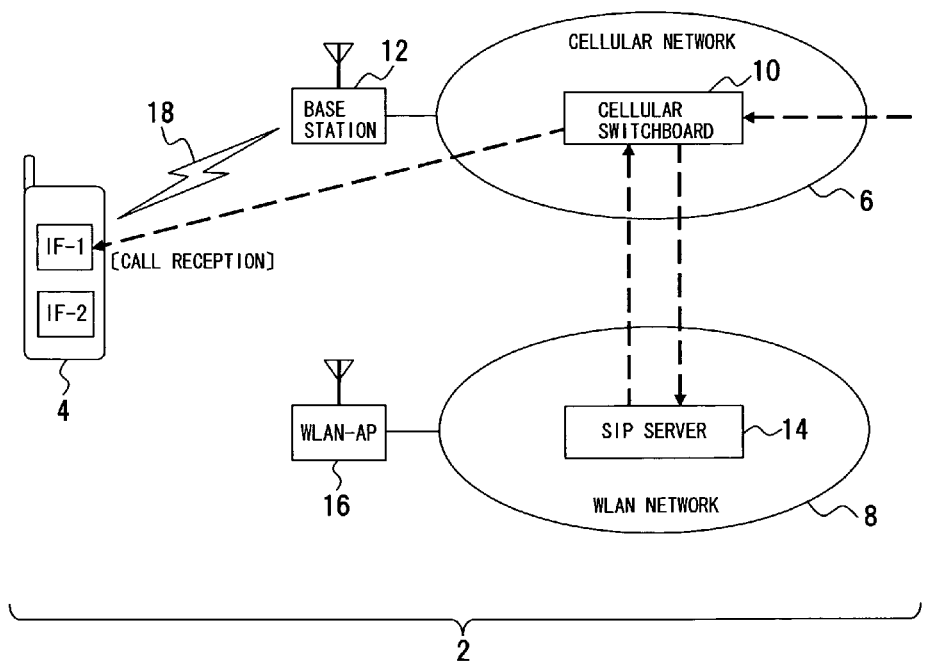
FIG. 17 depicts the detour call reception of IF-1 of the communication terminal apparatus.
Figure 18:
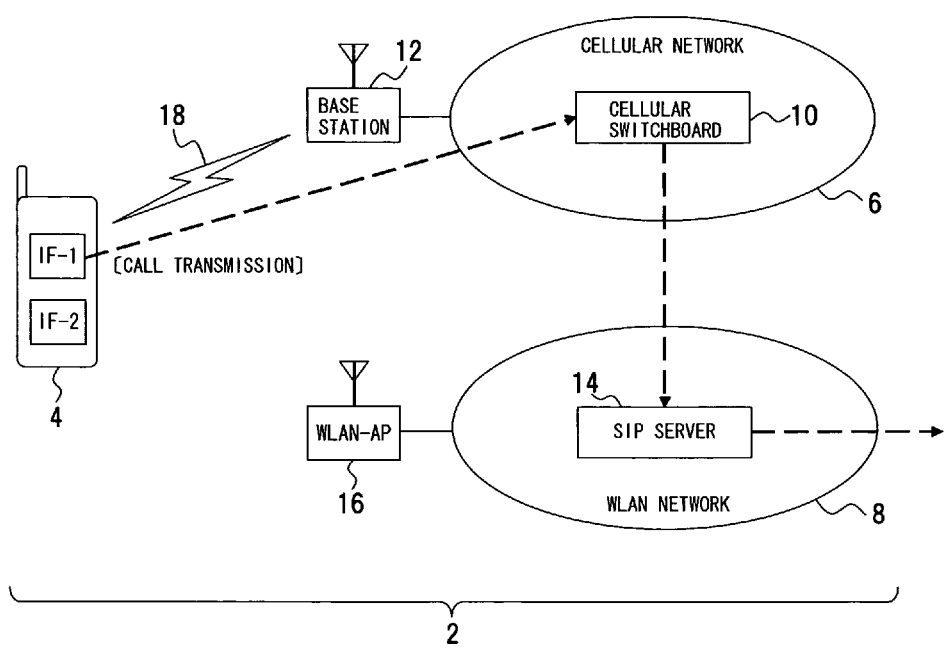
FIG. 18 depicts transmission of IF-1 of the communication terminal apparatus.
Figure 19:
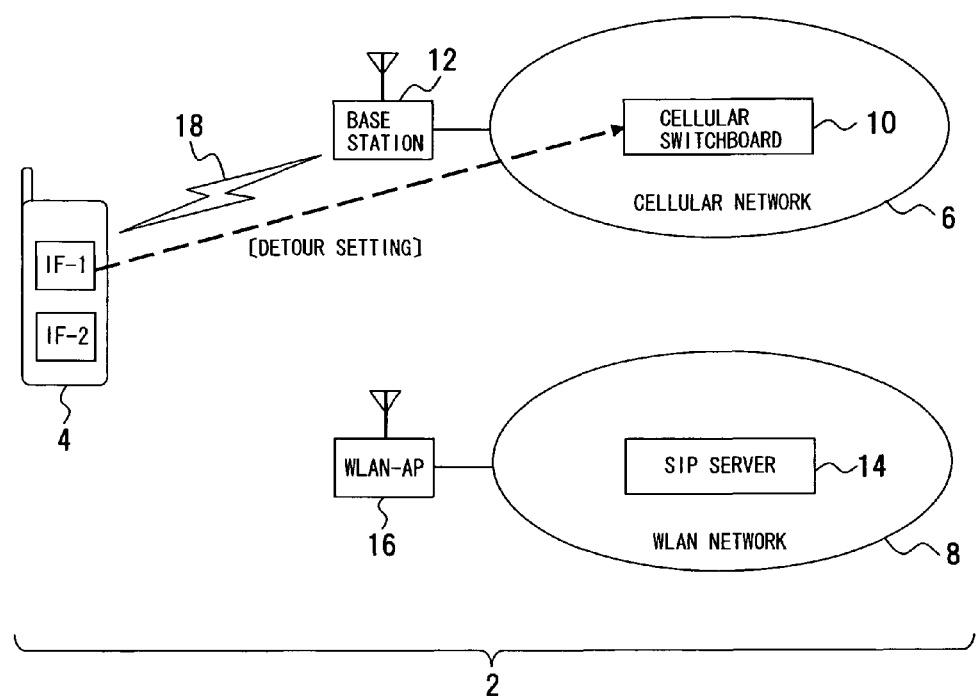
FIG. 19 depicts detour setting of the cellular switchboard (in the case of powering off IF-1)
Figure 21:
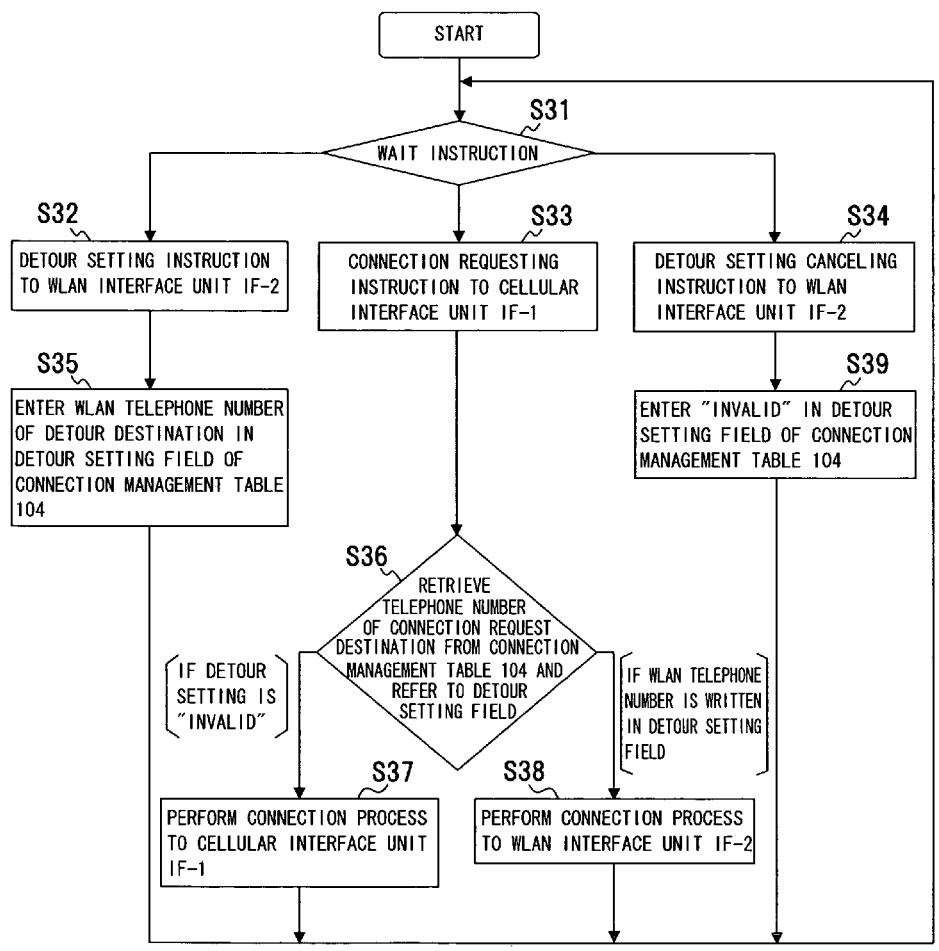
FIG. 21 is a flowchart of a process procedure of the cellular switchboard (in the case of powering off IF-1)
Figure 22:
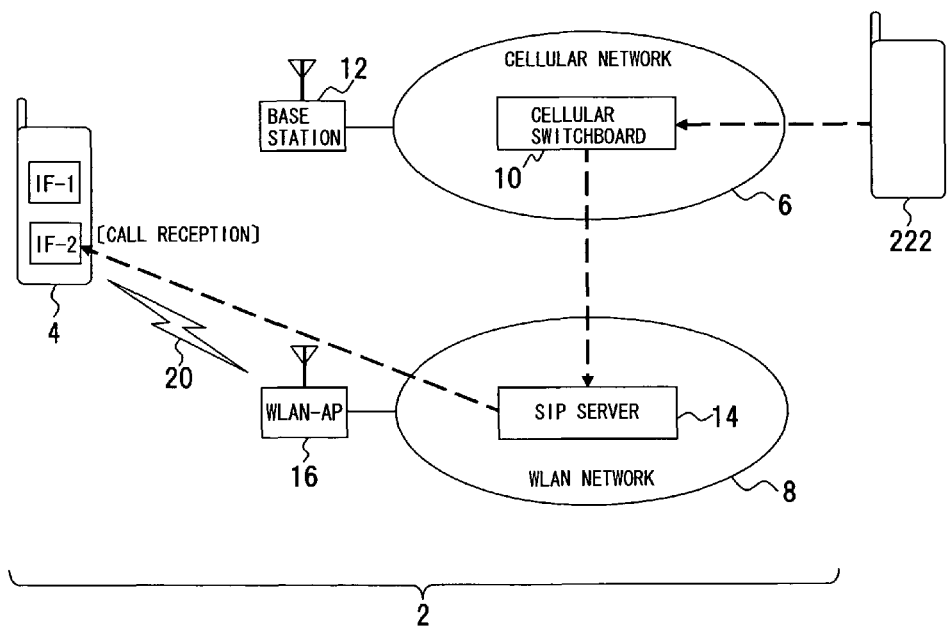
FIG. 22 depicts the detour call reception of IF-2 of the communication terminal apparatus.
Figure 23:
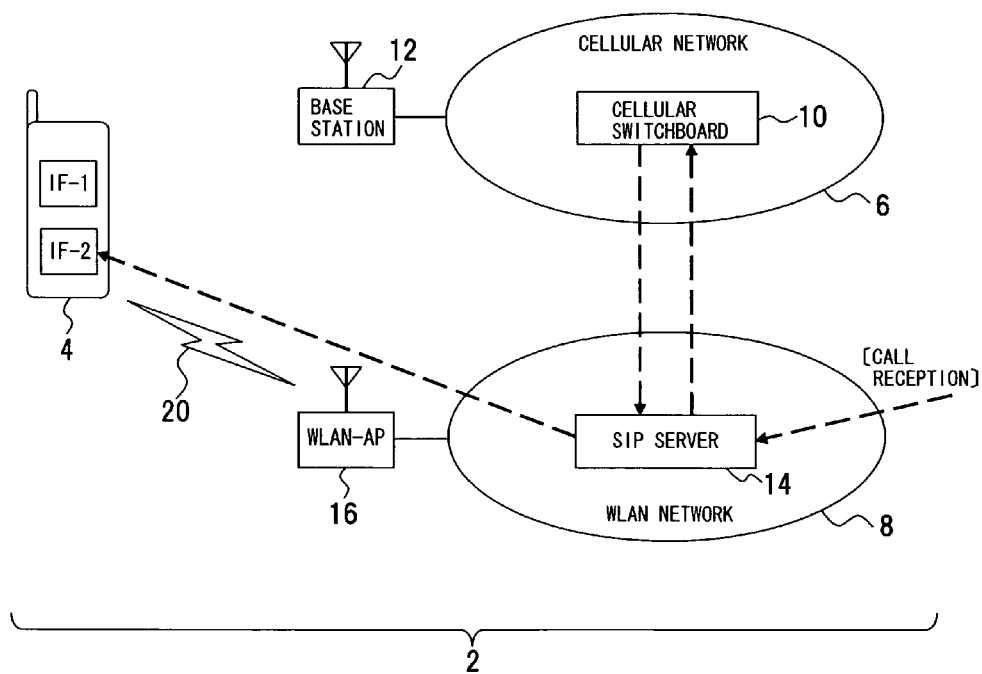
FIG. 23 depicts the detour call reception of IF-2 of the communication terminal apparatus.
Figure 24:
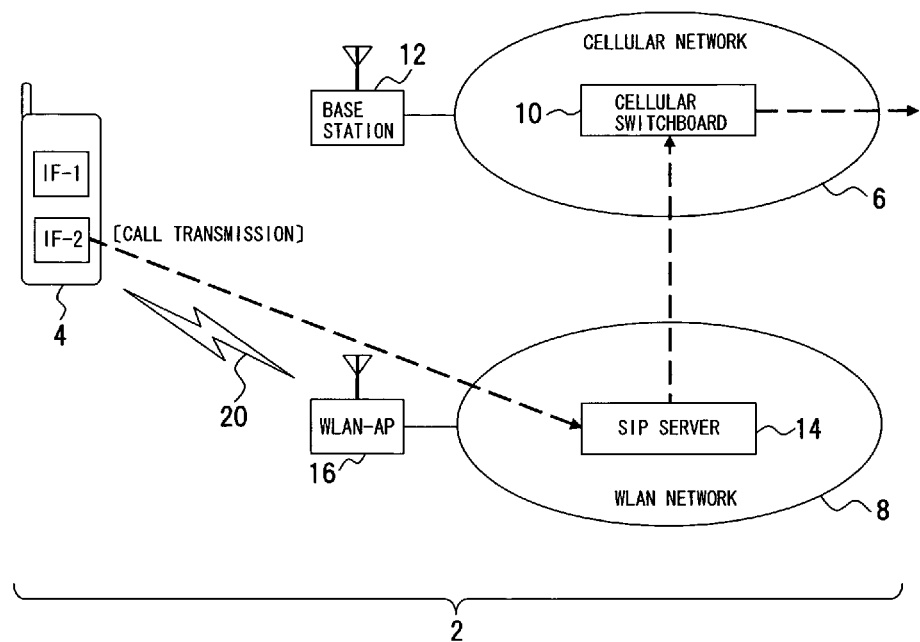
FIG. 24 depicts transmission of IF-2 of the communication terminal apparatus.

A specific process procedure of the communicating method of the embodiment will be described with reference to FIGS. 13 to 24. FIG. 13 depicts the detour setting of the SIP server; FIG. 14 depicts the connection management table representing the detour setting of the SIP server; FIG. 15 is a flowchart of a process procedure of the SIP server; FIGS. 16 and 17 depicts call reception at the time of the detour setting; FIG. 18 depicts transmission at the time of the detour setting; FIG. 19 depicts the detour setting of the cellular switchboard; FIG. 20 depicts the connection management table representing the detour setting of the cellular switchboard; FIG. 21 is a flowchart of a process procedure of the cellular switchboard; FIGS. 22 and 23 depict call reception at the time of the detour setting; and FIG. 24 depicts transmission at the time of the detour setting.

The process procedure of the communication method is executed by the computer and the communication control program 62 etc. disposed on the communication terminal apparatus 4, the cellular switchboard 10, or the SIP server 14, and the process procedure includes switching the power source, instruction the detour setting or setting cancellation, etc.

A. Case of Powering Off WLAN Interface Unit IF-2

If the WLAN interface unit IF-2 of the communication terminal apparatus 4 is powered off, as shown in FIG. 13, the above detour setting is performed from the WLAN interface unit IF-2 to the SIP server 14 before the power-off.

In this detour setting, the setting is performed in the SIP server 14 to detour calls for the telephone number of the WLAN interface unit IF-2 to the cellular interface unit IF-1. For example, when it is assumed that the cellular telephone number of the cellular interface unit IF-1 is "090-2222-0050", for example, that the telephone number of the WLAN interface unit IF-2 is "050-1111-0050", for example, and that the IP address is "10.18.42.50", for example, the detour setting is performed by writing a cellular telephone number "090-2222-0050" in the detour setting field for the telephone number "050-1111-0050" and the IP address "10.18.42.50" in the connection management table 106 of the SIP server 14 as shown in FIG. 14. As a result, the detour destination of the telephone number "050-1111-0050" is "090-2222-0050" and the detour (transfer) setting is completed by correlating the telephone numbers of different lines with each other.

After the detour setting, the WLAN interface unit IF-2 is powered off, and the WLAN interface unit IF-2 and the SIP server 14 are put into a cutoff state. That is, the communication terminal apparatus 4 can perform communication using only the cellular interface unit IF-1 and power saving can be achieved by canceling the power supply to the WLAN interface unit IF-2.

If such detour setting is performed, when a call from another communication terminal apparatus is received by the SIP server 14, the SIP server 14 refers to the connection management table 106 (FIG. 14), and if the connection destination is "050-1111-0050", since the detour destination "090-2222-0050" is described for this telephone number, the call is detoured to "090-2222-0050". That is, the call received by the SIP server 14 is detoured through the cellular switchboard 10 and received by the cellular interface unit IF-1.

In this case, if the detour setting is invalid, the call is received at the IP address "10.18.42.50" and the detour reception is not performed.

With regard to the case of powering off the WLAN interface unit IF-2, the process of the SIP server 14 will be described with reference to FIG. 15. FIG. 15 is a flowchart of a process procedure of the SIP server 14 in the case of powering off the WLAN interface unit IF-2.

In an instruction waiting state of the communication terminal apparatus 4, the SIP server 14 receives the next instruction (step S21).

This instruction is any one of a detour setting instruction to the cellular interface unit IF-1 (step S22), a connection requesting instruction to the WLAN interface unit IF-2 (step S23), and a detour setting canceling instruction to the cellular interface unit IF-1 (step S24).

In the case of the detour setting instruction (step S22), a cellular telephone number of a detour destination is entered in the detour setting field of the connection management table 106 (step S25).

In the case of the connection requesting instruction (step S23), a telephone number of the connection request destination is retrieved from the connection management table 106 and the detour setting field of the telephone number is referenced (step S26). If the detour setting is invalid, a connection process to the WLAN interface unit IF-2 is performed without performing the detouring to the cellular network 6 (step S27). If a telephone number is written in the detour setting field, a connection process to the cellular telephone number is performed (step S28).

In the case of the detour setting canceling instruction (step S24), "invalid" is entered in the detour setting field of the connection management table 106 (step S29).

After the detour setting, the WLAN interface unit IF-2 is powered off, and the WLAN interface unit IF-2 and the SIP server 14 are put into the cutoff state. That is, the communication terminal apparatus 4 can perform communication using only the cellular interface unit IF-1 and power saving can be achieved by canceling the power supply to the WLAN interface unit IF-2.

If such detour setting is performed, as shown in FIG. 16, when a call from another communication terminal apparatus 220 is received by the SIP server 14, the SIP server 14 refers to the connection management table 106 (FIG. 14), and if the connection destination is "050-1111-0050", since the detour destination "090-2222-0050" is described for this telephone number, the call is detoured to "090-2222-0050". That is, the call received by the SIP server 14 is detoured through the cellular switchboard 10 and received by the cellular interface unit IF-1.

As shown in FIG. 17, if the cellular switchboard 10 receives a request for connection through the WLAN network 8, i.e., the cellular switchboard 10 receives a call to "050-1111-0050", the cellular switchboard 10 issues a connection request to the SIP server 14. In this case, since the above detour setting is established in the SIP server 14, the cellular interface unit IF-1 is connected through the cellular switchboard 10 due to the detour setting. That is, although the call received by the cellular switchboard 10 is transferred to the SIP server 14, the call is returned to the cellular switchboard 10 due to the detour setting and the connection is switched to the cellular interface unit IF-1 through the cellular switchboard 10.

In this case, the transmission (so-called call request) of the communication terminal apparatus 4 is performed from the cellular interface unit IF-1 connected to the power source and, as shown in FIG. 18, communication with the WLAN network 8 can be performed by detouring from the cellular switchboard 10 to the SIP server 14.

B. Case of Powering Off Cellular Interface Unit IF-1

If the cellular interface unit IF-1 of the communication terminal apparatus 4 is powered off, as shown in FIG. 19, the above detour setting is performed from the cellular interface unit IF-1 to the cellular switchboard 10 before the power-off.

In this detour setting, the setting is performed in the cellular switchboard 10 to detour calls for the telephone number of the cellular interface unit IF-1 to the WLAN interface unit IF-2. For example, when the telephone numbers are as above, the detour setting is performed by writing the telephone number "050-1111-0050" in the detour setting field for the telephone number "090-2222-0050" in the connection management table 104 of the cellular switchboard 10 as shown in FIG. 20. As a result, the detour destination of the telephone number "090-2222-0050" is "050-1111-0050" and the detour (transfer) setting is completed by correlating the telephone numbers of different lines with each other in the same way.

With regard to the case of powering off the cellular interface unit IF-1, the process procedure of the cellular switchboard 10 will be described with reference to FIG. 21. FIG. 21 is a flowchart of a process procedure of the cellular switchboard 10 in the case of powering off the cellular interface unit IF-1.

In the instruction waiting state of the communication terminal apparatus 4, the cellular switchboard 10 receives the next instruction (step S31).

This instruction is any one of a detour setting instruction to the WLAN interface unit IF-2 (step S32), a connection requesting instruction to the cellular interface unit IF-1 (step S33), and a detour setting canceling instruction to the WLAN interface unit IF-2 (step S34).

In the case of the detour setting instruction (step S32), a WLAN telephone number of a detour destination is entered in the detour setting field of the connection management table 104 (step S35).

In the case of the connection requesting instruction (step S33), a telephone number of the connection request destination is retrieved from the connection management table 104 and the detour setting field of the telephone number is referenced (step S36). If the detour setting is invalid, a connection process to the cellular interface unit IF-1 is performed without performing the detouring to the WLAN network 8 (step S37). If a telephone number is written in the detour setting field, a connection process to the WLAN telephone number is performed (step S38).

In the case of the detour setting canceling instruction (step S34), "invalid" is entered in the detour setting field of the connection management table 104 (step S39).

After the detour setting, the cellular interface unit IF-1 is powered off, and the cellular interface unit IF-1 and the cellular switchboard 10 are put into the cutoff state. That is, the communication terminal apparatus 4 can perform communication using only the WLAN interface unit IF-2 and power saving can be achieved by canceling the power supply to the cellular interface unit IF-1.

If such detour setting is performed, as shown in FIG. 22, when a call from another communication terminal apparatus 222 is received by the cellular switchboard 10, the cellular switchboard 10 refers to the connection management table 104 (FIG. 20), and if the connection destination is "090-2222-0050", since the detour destination "050-1111-0050" is described for this telephone number, the call is detoured to "050-1111-0050". That is, the call received by the cellular switchboard 10 is detoured through the SIP server 14 and received by the WLAN interface unit IF-2.

As shown in FIG. 23, if the SIP server 14 receives a request for connection through the cellular network 6, i.e., the SIP server 14 receives a call to "090-2222-0050", the SIP server 14 issues a connection request to the cellular switchboard 10. In this case, since the above detour setting is established in the cellular switchboard 10, the WLAN interface unit IF-2 is connected through the SIP server 14 due to the detour setting. That is, although the call received by the SIP server 14 is transferred to the cellular switchboard 10, the call is returned to the SIP server 14 due to the detour setting and the connection is switched to the WLAN interface unit IF-2 through the SIP server 14.

In this case, the transmission of the communication terminal apparatus 4 is performed from the WLAN interface unit IF-2 connected to the power source and, as shown in FIG. 24, communication with the cellular network 6 can be performed by detouring from the SIP server 14 to the cellular switchboard 10.

According to this embodiment, the power saving can be achieved in the communication terminal apparatus 4 by reducing the time of connecting both the cellular interface unit IF-1 and the WLAN interface unit IF-2 to the power source, and since the interface units are switched depending on the field intensity, the economical efficiency can be improved by switching the interface depending on the fees and the reliability of the communication can be maintained.

Second Embodiment

Figure 27:
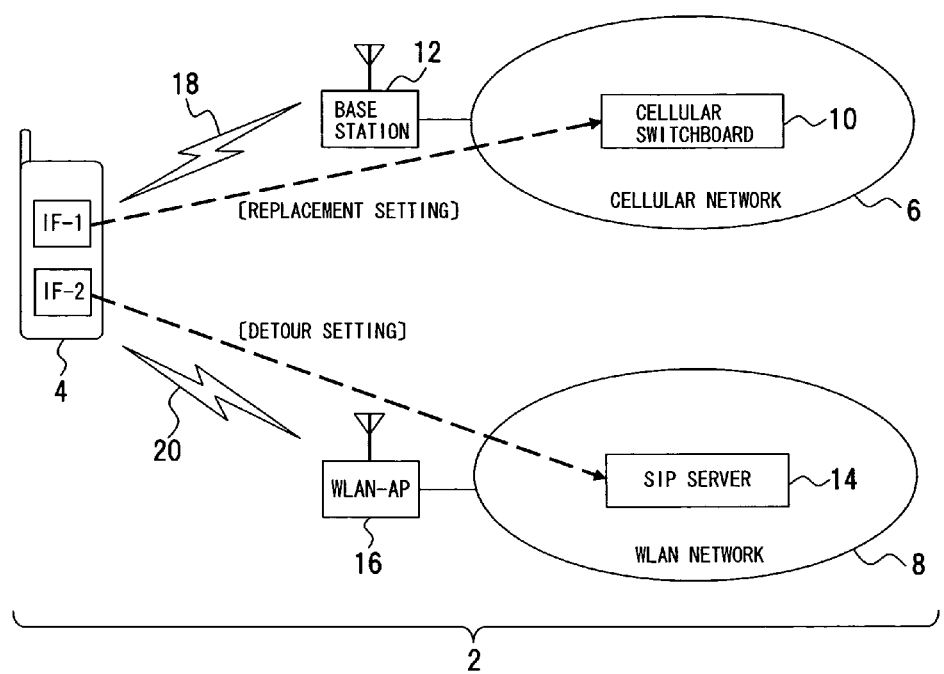
FIG. 27 depicts the detour setting and the replacement setting.
Figure 29:
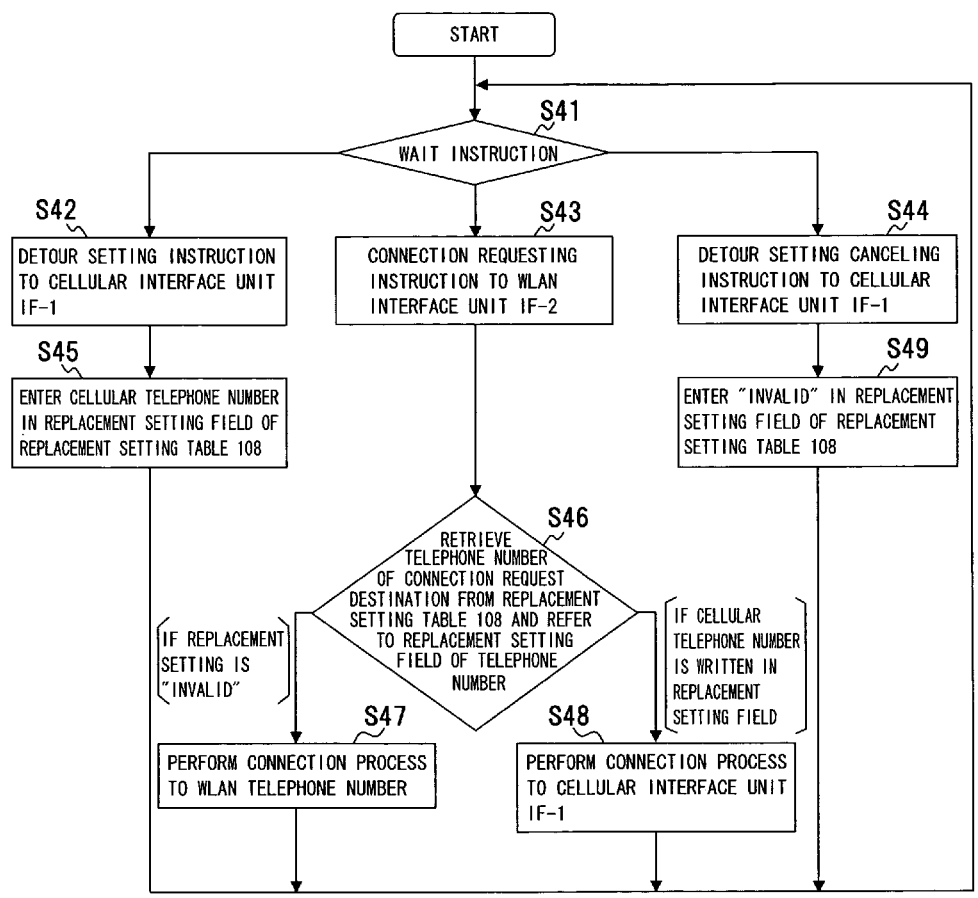
FIG. 29 is a flowchart of a process procedure of the cellular switchboard (in the case of powering off IF-2)
Figure 30:
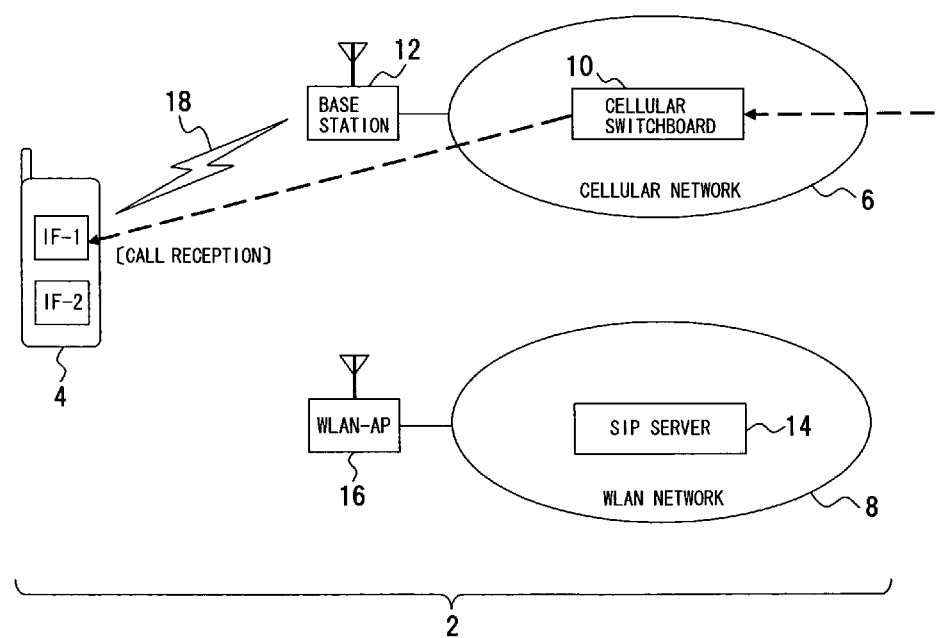
FIG. 30 depicts call reception of IF-1 of the communication terminal apparatus.
Figure 31:
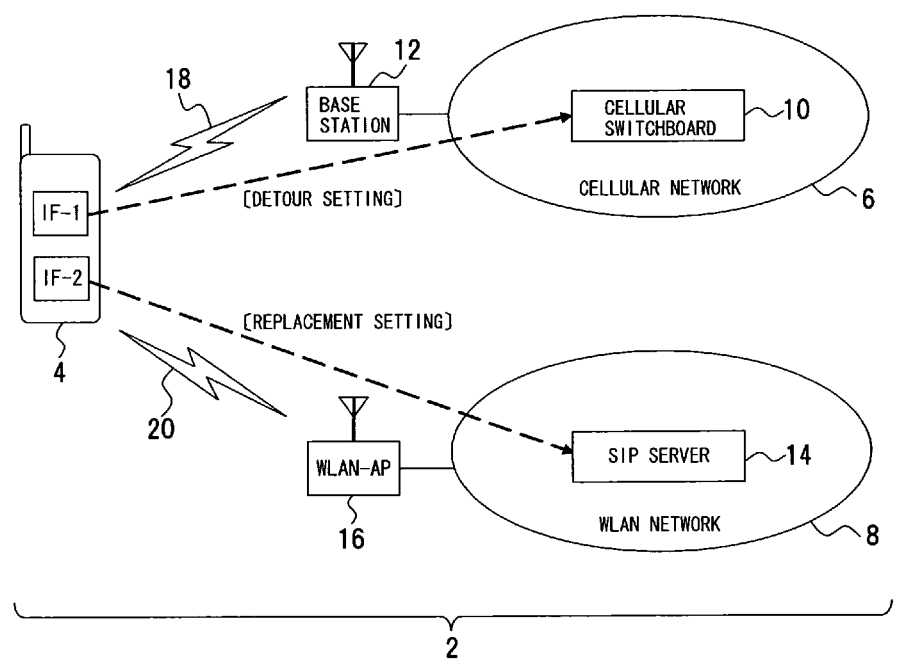
FIG. 31 depicts the detour setting and the replacement setting.
Figure 33:
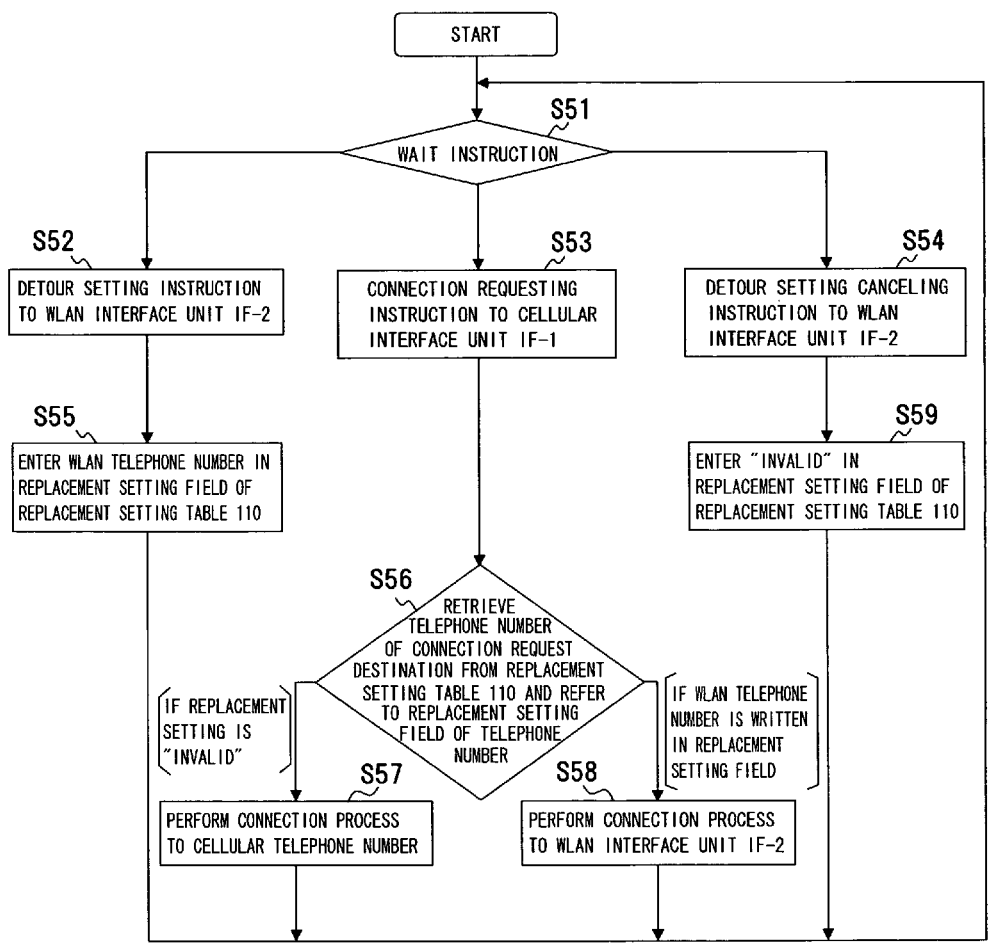
FIG. 33 is a flowchart of a process procedure of the SIP server (in the case of powering off IF-1)
Figure 34:
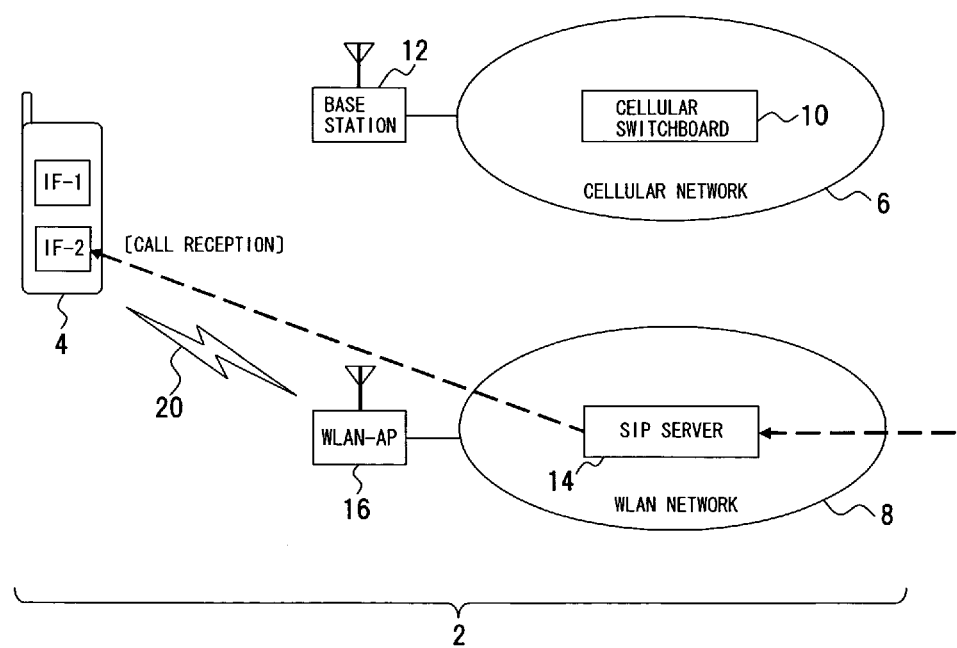
FIG. 34 depicts call reception of IF-2 of the communication terminal apparatus.

A second embodiment of the present invention will be described with reference to FIGS. 25 to 34. FIG. 25 depicts a replacement setting table of the cellular switchboard; FIG. 26 depicts a replacement setting table of the SIP server; FIG. 27 depicts the setting of the cellular switchboard and the SIP server; FIG. 28 depicts an example of the replacement setting table of the cellular switchboard; FIG. 29 is a flowchart of a process procedure of the cellular switchboard; FIG. 30 depicts call reception of the cellular interface unit IF-1; FIG. 31 depicts the setting of the cellular switchboard and the SIP server; FIG. 32 depicts an example of the replacement setting table of the SIP server; FIG. 33 is a flowchart of a process procedure of the SIP server; and FIG. 34 depicts call reception of the WLAN interface unit IF-2.

The second embodiment also uses the communication system 2 shown in FIG. 1, the communication terminal apparatus 4 shown in FIG. 2, the program/data storage memory 46 shown in FIG. 3, the cellular switchboard 10 shown in FIG. 5, the program/data storage memory 78 shown in FIG. 6, the SIP server 14 shown in FIG. 7, and the program/data storage memory 92 shown in FIG. 8.

The process procedure in the second embodiment is executed by the computer and the communication control program 62 disposed on the communication terminal apparatus 4, the cellular switchboard 10, or the SIP server 14, and the process procedure includes switching of the power source, detour setting or setting cancellation instruction, etc.

In this case, the data storage area 86 of the program/data storage memory 78 in the cellular switchboard 10 stores a replacement setting table 108 as shown in FIG. 25. The replacement setting table 108 is a means that manages replacement information of a telephone number that is a call destination, and the replacement setting table 108 includes telephone number fields and replacement setting fields that store replacement telephone numbers corresponding to the telephone numbers.

The data storage area 102 of the program/data storage memory 92 in the SIP server 14 stores a replacement setting table 110 as shown in FIG. 26. The replacement setting table 110 is a means that manages replacement information of a telephone number that is a call destination, and the replacement setting table 110 includes telephone number fields and replacement setting fields that store replacement telephone numbers corresponding to the telephone numbers.

The following process can be performed by using the replacement setting tables, 108, 110.

A. Powering Off WLAN Interface Unit IF-2

As shown in FIG. 27, if the detour setting (the first embodiment) is performed from the WLAN interface unit IF-2 to the SIP server 14 and the replacement setting is performed from the cellular interface unit IF-1 to the cellular switchboard 10, the calls to the cellular switchboard 10 can be prevented from detouring to the SIP server 14. That is, the round-trip process shown in FIG. 17 can be avoided between the cellular switchboard 10 and the SIP server 14.

In this case, as shown in FIG. 28, the replacement setting table 108 is set by writing the cellular telephone number "090-2222-0050" into the replacement setting field corresponding to the telephone number "050-1111-0050" in the telephone number field.

With regard to the case of powering off the WLAN interface unit IF-2, a process procedure of the cellular switchboard 10 will be described with reference to FIG. 29. FIG. 29 is a flowchart of a process procedure of the cellular switchboard 10 in the case of powering off the WLAN interface unit IF-2.

In the instruction waiting state of the communication terminal apparatus 4, the cellular switchboard 10 receives the next instruction (step S41).

This instruction is a detour setting instruction to the cellular interface unit IF-1 (step S42), a connection requesting instruction to the WLAN interface unit IF-2 (step S43), and a detour setting canceling instruction to the cellular interface unit IF-1 (step S44).

In the case of the detour setting instruction (step S42), the cellular telephone number is entered in the replacement setting field of the replacement setting table 108 (step S45).

In the case of the connection requesting instruction (step S43), a telephone number of the connection request destination is retrieved from the replacement setting table 108 and the replacement setting field of the telephone number is referenced (step S46). If the replacement setting is invalid, a connection process to the WLAN telephone number is performed (step S47). If a telephone number is written in the replacement setting field, a connection process to the cellular interface unit IF-1 is performed without performing the detouring to the WLAN network 8 (step S48).

In the case of the detour setting canceling instruction (step S44), "invalid" is entered in the replacement setting field of the replacement setting table 108 (step S49).

With this setting, a call can be received by the cellular interface unit IF-1 corresponding to the cellular telephone number "090-2222-0050" of the replacement setting.

B. Case of Powering Off Cellular Interface Unit IF-1

As shown in FIG. 31, if the detour setting (the first embodiment) is performed from the cellular interface unit IF-1 to the cellular switchboard 10 and the telephone number replacement setting is performed from the WLAN interface unit IF-2 to the SIP server 14, the calls to the SIP server 14 can be prevented from detouring to the cellular switchboard 10. That is, the round-trip process shown in FIG. 23 is avoided between the cellular switchboard 10 and the SIP server 14.

In this case, as shown in FIG. 32, the replacement setting table 110 is set by writing the telephone number "050-1111-0050" corresponding to the cellular telephone number "090-2222-0050" into the replacement setting field of the replacement setting table 110.

With regard to the case of powering off the cellular interface unit IF-1, a process procedure of the SIP server 14 will be described with reference to FIG. 33. FIG. 33 is a flowchart of a process procedure of the SIP server 14 in the case of powering off the cellular interface unit IF-1.

In the instruction waiting state of the communication terminal apparatus 4, the SIP server 14 receives the next instruction (step S51).

This instruction is a detour setting instruction to the WLAN interface unit IF-2 (step S52), a connection requesting instruction to the cellular interface unit IF-1 (step S53), and a detour setting canceling instruction to the WLAN interface unit IF-2 (step S54).

In the case of the detour setting instruction (step S52), the WLAN telephone number is entered in the replacement setting field of the replacement setting table 110 (step S55).

In the case of the connection requesting instruction (step S53), a telephone number of the connection request destination is retrieved from the replacement setting table 110 and the replacement setting field of the telephone number is referenced (step S56). If the replacement setting is invalid, a connection process to the cellular telephone number is performed (step S57). If a telephone number is written in the replacement setting field, a connection process to the WLAN interface unit IF-2 is performed without performing the detouring to the cellular network 6 (step S58).

In the case of the detour setting canceling instruction (step S54), "invalid" is entered in the replacement setting field of the replacement setting table 110 (step S59).

With this setting, a call can be received by the WLAN interface unit IF-2 corresponding to the telephone number "050-1111-0050" of the replacement setting.

Such a configuration contributes to the power saving in the communication terminal apparatus 4 as well as economical communication and the improvement in the reliability of the communication.

Third Embodiment

Figure 35:
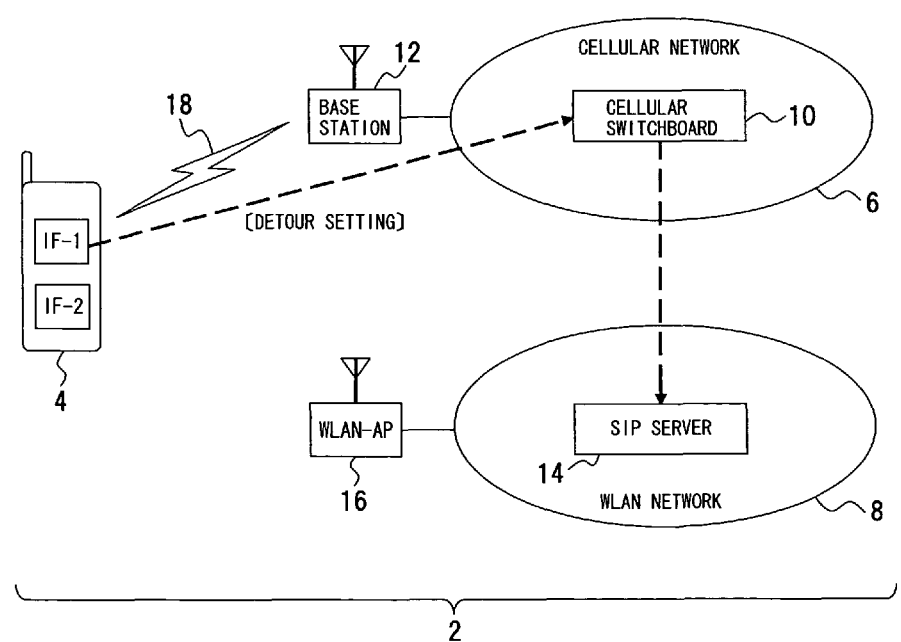
FIG. 35 depicts detour setting of the SIP server (in the case of powering off IF-2) in a communication system according to a third embodiment.
Figure 36:
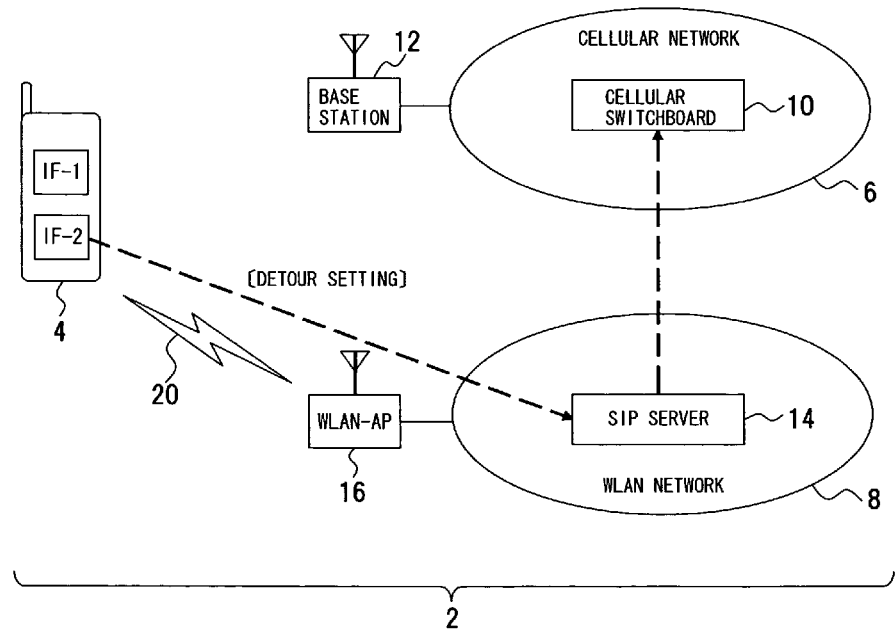
FIG. 36 depicts detour setting of the cellular switchboard (in the case of powering off IF-1)

A third embodiment of the present invention will be described with reference to FIGS. 35 and 36. FIG. 35 depicts the detour setting of the SIP server 14 by the cellular interface unit IF-1 and FIG. 36 depicts the detour setting of the cellular switchboard 10 by the WLAN interface unit IF-2.

The third embodiment also uses the communication system 2 shown in FIG. 1, the communication terminal apparatus 4 shown in FIG. 2, the program/data storage memory 46 shown in FIG. 3, the cellular switchboard 10 shown in FIG. 5, the program/data storage memory 78 shown in FIG. 6, the SIP server 14 shown in FIG. 7, and the program/data storage memory 92 shown in FIG. 8.

Although the detouring setting for the cellular switchboard 10 is performed by the cellular interface unit IF-1 to be powered off and the detouring setting for the SIP server 14 is performed by the WLAN interface unit IF-2 to be powered off in the first embodiment, the detour setting may be performed by any one of the cellular switchboard 10 and the WLAN interface unit IF-2. In the third embodiment, the detouring setting for the SIP server 14 is performed by the power-supplied cellular interface unit IF-1 and the detouring setting for the cellular switchboard 10 is performed by the power-supplied WLAN interface unit IF-2. Specifically, this will be described as follows.

A. Powering Off WLAN Interface Unit IF-2

As shown in FIG. 35, the detour setting is performed from the cellular interface unit IF-1 through the cellular switchboard 10 to the SIP server 14. The details of the setting and the process procedure are the same as the first embodiment and will not be described.

B. Case of Powering Off Cellular Interface Unit IF-1

As shown in FIG. 36, the detour setting is performed from the WLAN interface unit IF-2 through the SIP server 14 to the cellular switchboard 10. The details of the setting are the same as the first embodiment and will not be described.

By using this setting method, the detour setting can be performed depending on inevitable selection conditions such as a situation of radio wave; a degree of freedom is increased in the detour setting; the power saving is achieved in the communication terminal apparatus 4; and a contribution can be made to the economical communication and the improvement in the reliability of the communication.

Fourth Embodiment

Figure 37:
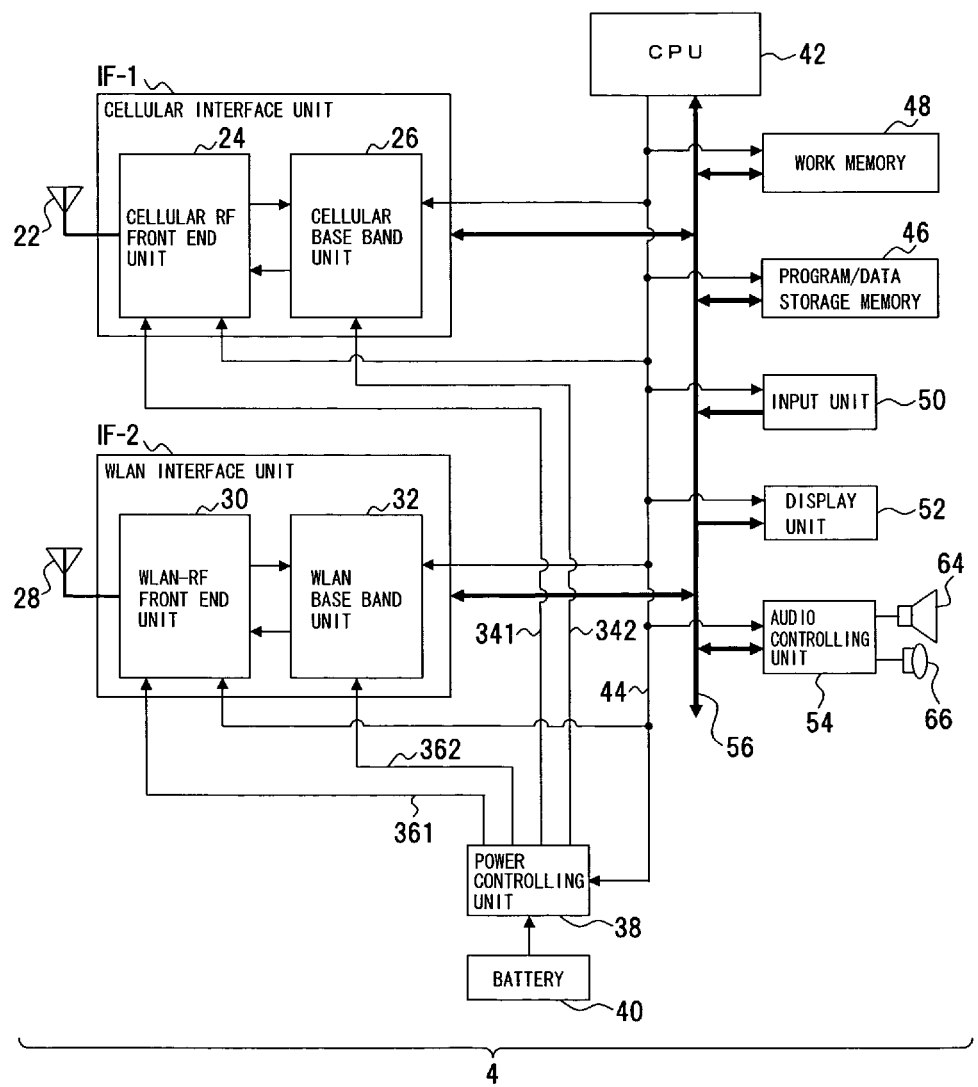
FIG. 37 depicts a communication terminal apparatus in a communication system according to a fourth embodiment.
Figure 38:
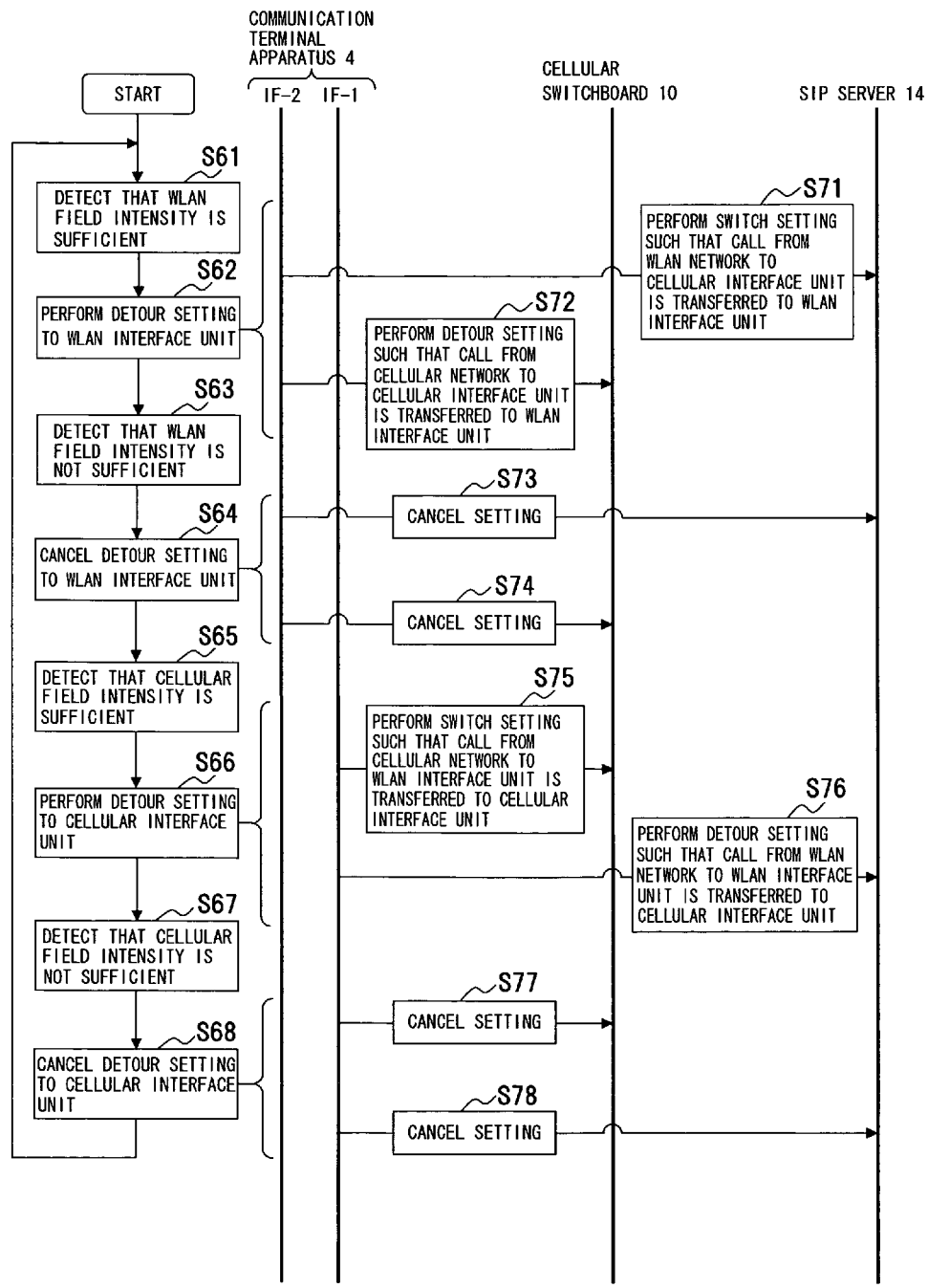
FIG. 38 is a flowchart of a process sequence.
Figure 39:
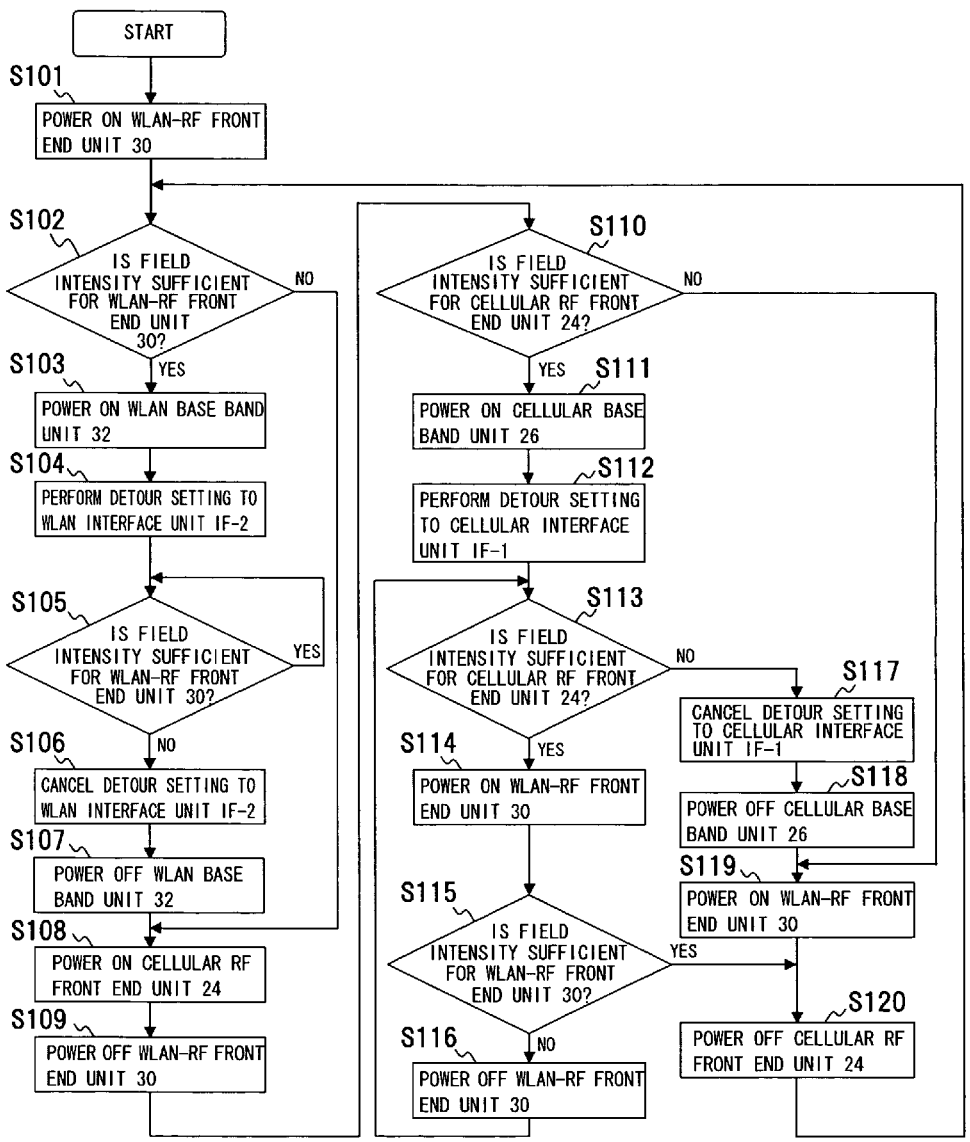
FIG. 39 is a flowchart of a process procedure of the communication terminal apparatus.

A fourth embodiment of the present invention will be described with reference to FIGS. 37 to 39. FIG. 37 depicts a communication terminal apparatus according to the fourth embodiment; FIG. 38 depicts a process sequence of the communication terminal apparatus 4, cellular switchboard 10, and the SIP server 14; and FIG. 39 is a flowchart of a control procedure of the interface units in the communication terminal apparatus. In FIG. 37, the same reference numerals are added to the same portions as FIG. 2 and the description thereof is omitted.

As shown in FIG. 37, in this embodiment, the cellular interface unit IF-1 of the communication terminal apparatus 4 is configured by connecting a power supply lines 341 between a cellular RF front end unit 24 and the power controlling unit 38 and connecting a power supply lines 342 between a cellular base band unit 26 and the power controlling unit 38 such that the cellular RF front end unit 24 and the cellular base band unit 26 are separately supplied with power. The WLAN interface unit IF-2 is also configured by connecting a power supply lines 361 between a WLAN-RF front end unit 30 and the power controlling unit 38 and connecting a power supply lines 362 between a WLAN base band unit 32 and the power controlling unit 38 such that the WLAN-RF front end unit 30 and the WLAN base band unit 32 are separately supplied with power.

In such a configuration, the cellular RF front end unit 24 and the WLAN-RF front end unit 30 can always be connected to the power source and the connection of the power source can be switched to the cellular base band unit 26 or the WLAN base band unit 32 depending on selection conditions such as the field intensity.

The fourth embodiment also uses the communication system 2 shown in FIG. 1, the program/data storage memory 46 shown in FIG. 3, the cellular switchboard 10 shown in FIG. 5, the program/data storage memory 78 shown in FIG. 6, the SIP server 14 shown in FIG. 7, and the program/data storage memory 92 shown in FIG. 8.

In the process sequence of the communication terminal apparatus 4, cellular switchboard 10, and the SIP server 14, the power source of the cellular interface unit IF-1 and the WLAN interface unit IF-2 is switched and the detour setting and process are performed for the cellular switchboard 10 and the SIP server 14 depending on the field intensity, as shown in FIG. 38. The process in the process sequence is performed by the above communication control program.

In this case, if it is detected that the field intensity is sufficient for the WLAN interface unit IF-2 (step S61), the detour setting is performed to detour calls to the WLAN interface unit IF-2 (step S62). The power source is connected to the WLAN interface unit IF-2 and the cellular interface unit IF-1 is powered off. If it is detected that the field intensity is insufficient for the WLAN interface unit IF-2 (step S63), the detour setting to the WLAN interface unit IF-2 is cancelled (step S64) and if it is detected that the field intensity is sufficient for the cellular interface unit IF-1 (step S65), the detour setting is performed to detour calls to the cellular interface unit IF-1 (step S66). In this case, the power source is connected to the cellular interface unit IF-1 and the WLAN interface unit IF-2 is powered off. If it is detected that the field intensity is insufficient for the cellular interface unit IF-1 (step S67), the detour setting to the cellular interface unit IF-1 is cancelled (step S68).

Specifically, if the field intensity is sufficient for the WLAN interface unit IF-2, the switch setting is performed from the WLAN interface unit IF-2 to the SIP server 14 (step S71). In This switch setting, calls from the WLAN network 8 to the cellular interface unit IF-1 are transferred to the WLAN interface unit IF-2. The detour setting is performed from the WLAN interface unit IF-2 to the cellular switchboard 10 (step S72). In this detour setting, calls from the cellular network 6 to the cellular interface unit IF-1 are transferred to the WLAN interface unit IF-2.

After the setting, if it is detected that the field intensity is insufficient for the WLAN interface unit IF-2 to perform communication, the setting from the WLAN interface unit IF-2 to the SIP server 14 is cancelled (step S73) and the detour setting to the cellular switchboard 10 is also cancelled (step S74).

After the setting cancellation, if the field intensity is sufficient for the cellular interface unit IF-1, the switch setting to the cellular switchboard 10 is performed (step S75). In This switch setting, calls from the cellular network 6 to the WLAN interface unit IF-2 are transferred to the cellular interface unit IF-1. The detour setting is performed from the cellular interface unit IF-1 to the SIP server 14 (step S76). In this detour setting, calls from the WLAN network 8 to the WLAN interface unit IF-2 are transferred to the cellular interface unit IF-1.

If it is detected that the field intensity of the cellular interface unit IF-1 is insufficient, the setting from the cellular interface unit IF-1 to the cellular switchboard 10 is cancelled (step S77) and the detour setting to the SIP server 14 is also cancelled (step S78).

Description will be made of a process procedure of the power source switching corresponding to the process sequence of FIG. 38 and the corresponding detour setting and setting cancellation with reference to FIG. 39. FIG. 39 is a flowchart of the process procedure of the power source switching and the corresponding detour setting and setting cancellation of the cellular interface unit IF-1 and the WLAN interface unit IF-2.

This process procedure is executed by the computer and the communication control program 62 disposed on the communication terminal apparatus 4, and the process procedure includes switching of the power source, determination of the intensity of the received electric wave, and detour setting or setting cancellation instruction, etc.

The power source is connected to the WLAN-RF front end unit 30 of the WLAN interface unit IF-2 (step S101). The field intensity for the WLAN-RF front end unit 30 is detected to check whether the field intensity is sufficient (step S102). If the field intensity is sufficient, the WLAN base band unit 32 is powered on (step S103), and the detour setting to the WLAN interface unit IF-2 is performed (step S104).

To determine whether the current setting state is maintained, the field intensity for the WLAN-RF front end unit 30 is detected to check whether the field intensity is sufficient (step S105). If the field intensity is sufficient, the current setting state is maintained. If the field intensity is insufficient, the detour setting to the WLAN interface unit IF-2 is canceled (step S106) and the WLAN base band unit 32 is powered off (step S107).

The cellular RF front end unit 24 of the cellular interface unit IF-1 is powered on (step S108). Even if the field intensity is insufficient at step S102, the cellular RF front end unit 24 is powered on as well. The WLAN-RF front end unit 30 is powered off (step S109).

The field intensity for the cellular RF front end unit 24 is detected to check whether the field intensity is sufficient (step S110). If the field intensity is sufficient, the cellular base band unit 26 is powered on (S111) and the detour setting to the cellular interface unit IF-1 is performed (step S112).

To determine whether the current setting state is maintained, the field intensity for the cellular RF front end unit 24 is detected to check whether the field intensity is sufficient (step S113). If the field intensity is sufficient, the WLAN-RF front end unit 30 of the WLAN interface unit IF-2 is powered on (step S114). To determine whether the current setting state is maintained, the field intensity for the WLAN-RF front end unit 30 is detected to check whether the field intensity is sufficient (step S115). If the field intensity is insufficient, the WLAN-RF front end unit 30 is powered off (step S116), and the procedure goes back to step S113.

If the field intensity of the cellular RF front end unit 24 is insufficient at step S113, the detour setting to the cellular interface unit IF-1 is canceled (step S117); the cellular base band unit 26 is powered off (step S118); the WLAN-RF front end unit 30 is powered on (step S119); the cellular RF front end unit 24 is powered off (step S120); and the procedure goes to step S102. If the field intensity of the WLAN-RF front end unit 30 is sufficient at step S115, the procedure goes to step S120.

With this process procedure, the detour setting of the cellular interface unit IF-1 and the WLAN interface unit IF-2 is changed depending on the field intensity and the optimum communication state is maintained. As is the case with the above embodiments, the power saving is achieved in the communication terminal apparatus 4; the reliability of communication is improved; and a contribution can be made to the economical communication.

Fifth Embodiment

A fifth embodiment of the present invention will be described with reference to FIGS. 40 to 43. FIGS. 40 to 43 are flowcharts of process procedures of the communication terminal apparatus.

The fifth embodiment shows process procedures when priorities are set for selecting the operation of the cellular interface unit IF-1 and the WLAN interface unit IF-2. These process procedures are processes executed by the communication control program 62 or modifications thereof disposed on the communication terminal apparatus 4 as described above.

The fifth embodiment also uses the communication system 2 shown in FIG. 1, the communication terminal apparatus 4 shown in FIG. 2, the program/data storage memory 46 shown in FIG. 3, the cellular switchboard 10 shown in FIG. 5, the program/data storage memory 78 shown in FIG. 6, the SIP server 14 shown in FIG. 7, and the program/data storage memory 92 shown in FIG. 8.

The flowchart shown in FIG. 40 is a process when using an advantage for a user, such as fees, as the selection condition to set a priority condition. The priority can be changed as needed.

In this process, a priority determination process is performed for the cellular interface unit IF-1 and the WLAN interface unit IF-2 (step S201). If it is more advantageous to select the cellular interface unit IF-1 than the WLAN interface unit IF-2 when determining the priorities (IF-1>IF-2), the cellular interface unit IF-1 is powered on (step S202) to operate the cellular interface unit IF-1. In this case, the detour setting to the cellular interface unit IF-1 is performed (step S203) and the priorities of the interface units are checked in this state (step S204). If it is more advantageous to select the cellular interface unit IF-1 than the WLAN interface unit IF-2 in this priority check (IF-1>IF-2), the current setting is maintained.

If the situation changes and it is more advantageous to select the WLAN interface unit IF-2 than the cellular interface unit IF-1 (IF-2>IF-1), the current setting is canceled. In this case, the detour setting to the cellular interface unit IF-1 is canceled (step S205); the cellular interface unit IF-1 is powered off (step S206); and the operation is switched to the WLAN interface unit IF-2 (step S207).

In the priority determination process for the cellular interface unit IF-1 and the WLAN interface unit IF-2 (step S201), if it is more advantageous to select the WLAN interface unit IF-2 than the cellular interface unit IF-1 (IF-2>IF-1), the WLAN interface unit IF-2 is powered on (step S207), the detour setting to the WLAN interface unit IF-2 is performed (step S208), and the priorities of the cellular interface unit IF-1 and the WLAN interface unit IF-2 are checked in this state (step S209). If it is more advantageous to select the WLAN interface unit IF-2 than the cellular interface unit IF-1 in this priority check (IF-2>IF-1), the latest setting is maintained.

If the situation changes and it is more advantageous to select the cellular interface unit IF-1 than the WLAN interface unit IF-2 (IF-1>IF-2), the detour setting to the WLAN interface unit IF-2 is canceled (step S210); the WLAN interface unit IF-2 is powered off (step S211); and the cellular interface unit IF-1 is selected (step S202).

Specifically, the operation of the interface units is switched by the above process depending on the fee conditions, and a user can receive the application of the advantageous fee condition.

In the above process, the detour setting or detour setting cancellation may be performed from any route through the cellular switchboard 10 or the SIP server 14 correspondingly to the power-off of the cellular interface unit IF-1 or the WLAN interface unit IF-2, and the detour setting or detour setting cancellation may be performed with the use of any one of the first to fourth embodiments.

Figure 41:
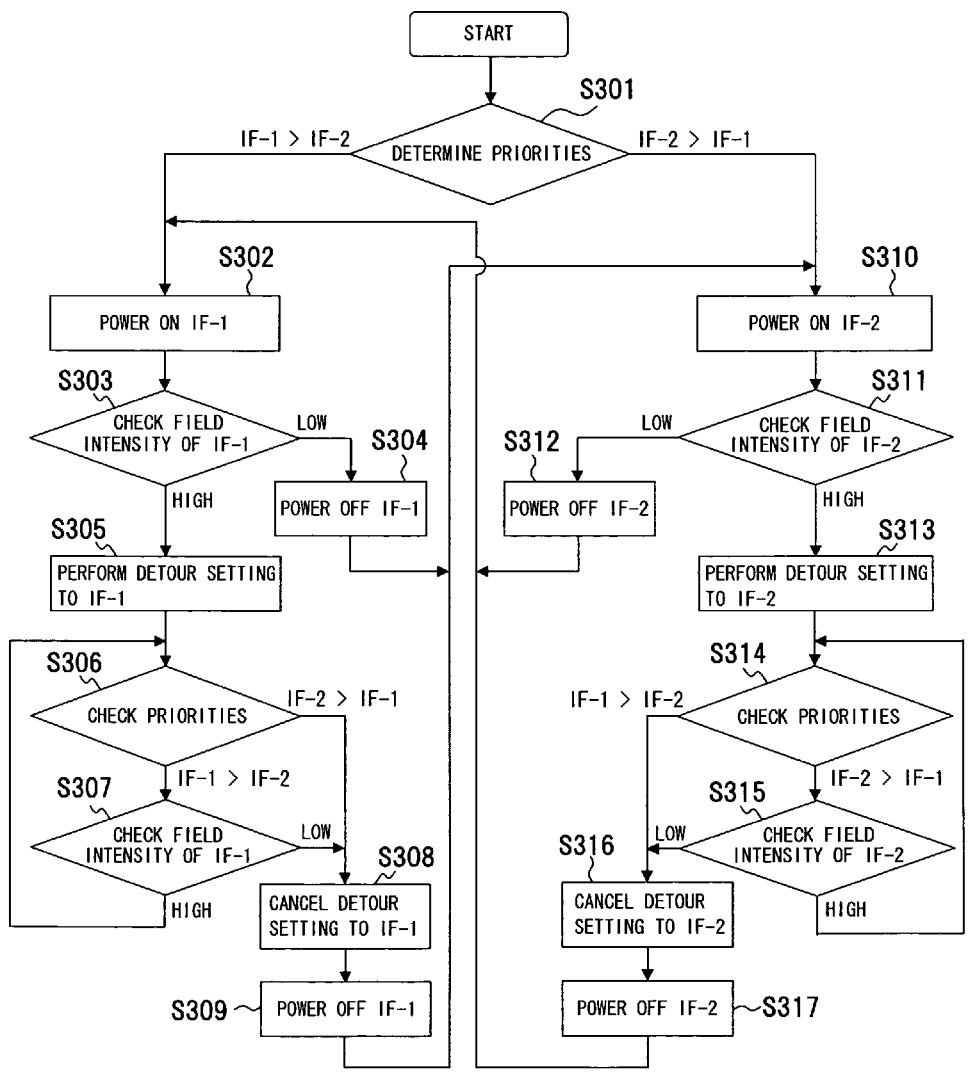
FIG. 41 is a flowchart of another process procedure of the communication terminal apparatus.

In the flowchart shown in FIG. 41, a process depending on the field intensity is added to the process procedure. The reliability of communication can be enhanced by the detour setting and the detour setting cancellation depending on the field intensity. In this case, the detour setting and the detour setting cancellation are controlled by both the field intensity and the priorities.

In this process, the priority determination process is also performed for the cellular interface unit IF-1 and the WLAN interface unit IF-2 (step S301), and If it is more advantageous to select the cellular interface unit IF-1 than the WLAN interface unit IF-2 when determining the priorities (IF-1>IF-2), the cellular interface unit IF-1 is powered on (step S302) to operate the cellular interface unit IF-1. In this case, the field intensity of the cellular interface unit IF-1 is checked (step S303); if the field intensity is low, the cellular interface unit IF-1 is powered off (step S304) if the field intensity is high, the detour setting to the cellular interface unit IF-1 is performed (step S305); and the priorities of the cellular interface unit IF-1 and the WLAN interface unit IF-2 are checked in this state (step S306). If the priority of the cellular interface unit IF-1 is higher than that of the WLAN interface unit IF-2, the field intensity of the cellular interface unit IF-1 is checked (step S307), and if the field intensity is high, the current setting is maintained (steps S306, 307).

If the priority of the WLAN interface unit IF-2 is higher than that of the cellular interface unit IF-1 in the priority check (step S306) or if the field intensity is low in the field intensity check (step S307), the detour setting to the cellular interface unit IF-1 is canceled (step S308); the cellular interface unit IF-1 is powered off (step S309); and the WLAN interface unit IF-2 is selected (step S309).

In the priority determination process for the cellular interface unit IF-1 and the WLAN interface unit IF-2 (step S301), if the priority of the WLAN interface unit IF-2 is higher (IF-2>IF-1) and if the cellular interface unit IF-1 is powered off (steps S304, S309), the WLAN interface unit IF-2 is powered on (step S310). When the field intensity of the WLAN interface unit IF-2 is checked (step S311), if the field intensity is low, the WLAN interface unit IF-2 is powered off (step S312) and the procedure goes to step S302.

If the field intensity of the WLAN interface unit IF-2 is high, the detour setting to the WLAN interface unit IF-2 is performed (step S313) and the priorities of the cellular interface unit IF-1 and the WLAN interface unit IF-2 are checked in this state (step S314). If the priority of the WLAN interface unit IF-2 is higher than that of the cellular interface unit IF-1, the field intensity of the WLAN interface unit IF-2 is checked (step S315), and if the field intensity is high, the current setting is maintained (steps S314, S315).

If the priority of the cellular interface unit IF-1 is higher than that of the WLAN interface unit IF-2 in the priority check (step S314) or if the field intensity is low in the field intensity check of the WLAN interface unit IF-2 (step S315), the detour setting to the WLAN interface unit IF-2 is canceled (step S316); the WLAN interface unit IF-2 is powered off (step S317); and the cellular interface unit IF-1 is selected (step S302).

Specifically, the operation of the interface units is switched by the above process depending on the fee conditions, and a user can receive the application of the advantageous fee condition.

Figure 42:
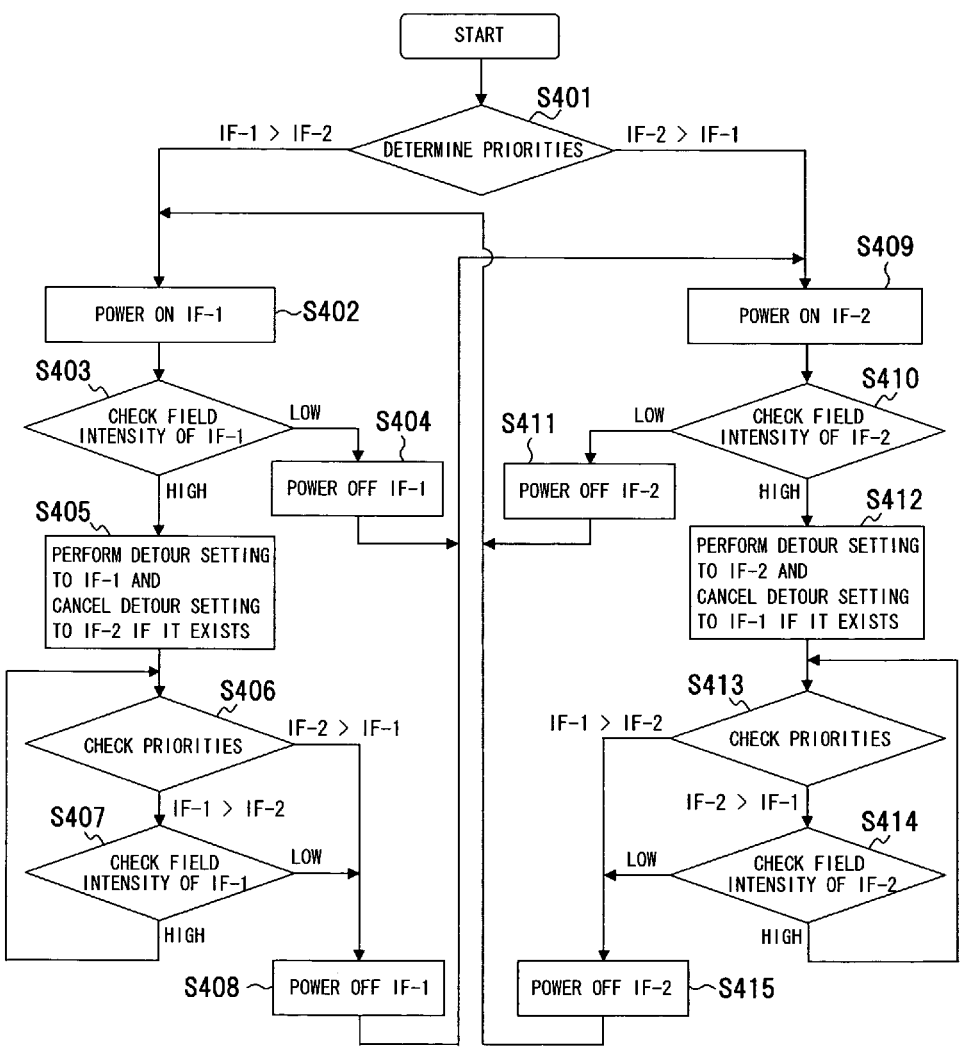
FIG. 42 is a flowchart of another process procedure of the communication terminal apparatus.

The flowchart shown in FIG. 42 is a process when the setting cancellation of a network is performed by the other interface unit, and the detour setting is performed for detouring to the network with stronger electric wave. That is, the cancellation of the detour setting is performed by the other interface unit.

In this process, the priorities of the cellular interface unit IF-1 and the WLAN interface unit IF-2 are determined when the process is started (step S401), and if the cellular interface unit IF-1 is prioritized, the cellular interface unit IF-1 is powered on (step S402) and the field intensity of the cellular interface unit IF-1 is checked (step S403). If the field intensity is low, the cellular interface unit IF-1 is powered off (step S404); if the field intensity is high, the detour setting to the cellular interface unit IF-1 is performed; and if the detour setting to the WLAN interface unit IF-2 is in effect, the setting is cancelled (step S405).

The priorities of the cellular interface unit IF-1 and the WLAN interface unit IF-2 are checked (step S406); if the cellular interface unit IF-1 is selected, the field intensity of the cellular interface unit IF-1 is checked (step S407); and if the field intensity is high, the current setting is maintained (steps S406, 407).

If the priority of the WLAN interface unit IF-2 is higher when checking the priorities of the cellular interface unit IF-1 and the WLAN interface unit IF-2 (step S406) or if the field intensity is low when checking the field intensity of the cellular interface unit IF-1 (step S407), the cellular interface unit IF-1 is powered off (step S408) for shifting to the WLAN interface unit IF-2 (step S409).

When determining the priorities of the cellular interface unit IF-1 and the WLAN interface unit IF-2 (step S401), if the WLAN interface unit IF-2 is prioritized, the WLAN interface unit IF-2 is powered on (step S409) and the field intensity of the WLAN interface unit IF-2 is checked (step S410). If the field intensity is low, the WLAN interface unit IF-2 is powered off (step S411); if the field intensity is high, the detour setting to the WLAN interface unit IF-2 is performed; and if the detour setting to the cellular interface unit IF-1 is in effect, the setting is cancelled (step S412).

The priorities of the cellular interface unit IF-1 and the WLAN interface unit IF-2 are checked (step S413); if the WLAN interface unit IF-2 is selected, the field intensity of the WLAN interface unit IF-2 is checked (step S414); and if the field intensity is high, the current setting is maintained (steps S413, 414).

If the priority of the cellular interface unit IF-1 is higher when checking the priorities of the cellular interface unit IF-1 and the WLAN interface unit IF-2 (step S413) or if the field intensity is low when checking the field intensity of the WLAN interface unit IF-2 (step S414), the WLAN interface unit IF-2 is powered off (step S415) for shifting to the cellular interface unit IF-1 (step S402).

Figure 43:
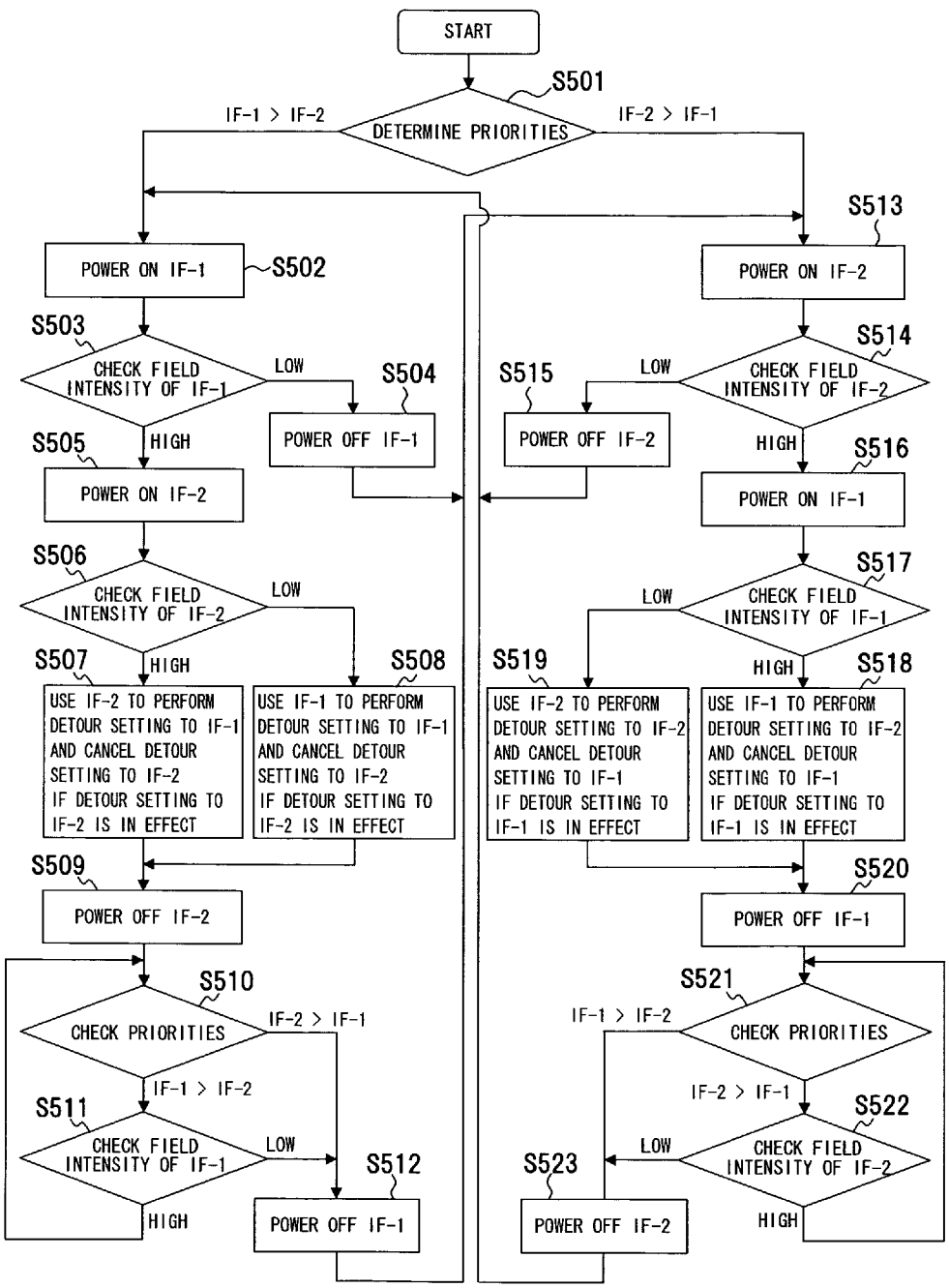
FIG. 43 is a flowchart of another process procedure of the communication terminal apparatus.

The flowchart shown in FIG. 43 is a process when the setting or setting cancellation of a network is performed by the other interface unit, and the detour setting is performed for detouring to the network with stronger electric wave. That is, the detour setting and the cancellation thereof are performed by the other interface unit.

In this process, the priorities of the cellular interface unit IF-1 and the WLAN interface unit IF-2 are determined when the process is started (step S501), and if the cellular interface unit IF-1 is prioritized, the cellular interface unit IF-1 is powered on (step S502) and the field intensity of the cellular interface unit IF-1 is checked (step S503). If the field intensity is low, the cellular interface unit IF-1 is powered off (step S504); if the field intensity is high, the WLAN interface unit IF-2 is powered on (step S505); and the field intensity of the WLAN interface unit IF-2 is checked (step S506). If the field intensity is high, the detour setting to the cellular interface unit IF-1 is performed by using the WLAN interface unit IF-2; if the detour setting to the WLAN interface unit IF-2 is in effect, the detour setting to the WLAN interface unit IF-2 is cancelled (step S507); if the field intensity is low, the detour setting to the cellular interface unit IF-1 is performed by using the cellular interface unit IF-1; if the detour setting to the WLAN interface unit IF-2 is in effect, the detour setting to the WLAN interface unit IF-2 is cancelled (step S508); and the WLAN interface unit IF-2 is powered off (step S509).

The priorities of the cellular interface unit IF-1 and the WLAN interface unit IF-2 are checked (step S510); if the priority of the cellular interface unit IF-1 is higher, the field intensity of the cellular interface unit IF-1 is checked (step S511); and if the field intensity is high, the current setting is maintained (steps S510, 511).

If the priority of the WLAN interface unit IF-2 is higher when checking the priorities of the cellular interface unit IF-1 and the WLAN interface unit IF-2 (step S510) or if the field intensity is low when checking the field intensity of the cellular interface unit IF-1 (step S511), the cellular interface unit IF-1 is powered off (step S512) for shifting to the WLAN interface unit IF-2 (step S513).

When determining the priorities of the cellular interface unit IF-1 and the WLAN interface unit IF-2 (step S501), if the WLAN interface unit IF-2 is prioritized, the WLAN interface unit IF-2 is powered on (step S513) and the field intensity of the WLAN interface unit IF-2 is checked (step S514). If the field intensity is low, the WLAN interface unit IF-2 is powered off (step S515), and if the field intensity is high, the cellular interface unit IF-1 is powered on (step S516) and the field intensity of the cellular interface unit IF-1 is checked (step S517). If the field intensity is high, the detour setting to the WLAN interface unit IF-2 is performed by using the cellular interface unit IF-1; if the detour setting to the cellular interface unit IF-1 is in effect, the detour setting to the cellular interface unit IF-1 is cancelled (step S518); if the field intensity is low, the detour setting to the WLAN interface unit IF-2 is performed by using the WLAN interface unit IF-2; if the detour setting to the cellular interface unit IF-1 is in effect, the detour setting to the cellular interface unit IF-1 is cancelled (step S519); and the cellular interface unit IF-1 is powered off (step S520).

The priorities of the cellular interface unit IF-1 and the WLAN interface unit IF-2 are checked (step S521); if the priority of the WLAN interface unit IF-2 is higher, the field intensity of the WLAN interface unit IF-2 is checked (step S522); and if the field intensity is high, the current setting is maintained (steps S521, 522).

If the priority of the cellular interface unit IF-1 is higher when checking the priorities of the cellular interface unit IF-1 and the WLAN interface unit IF-2 (step S521) or if the field intensity is low when checking the field intensity of the WLAN interface unit IF-2 (step S522), the WLAN interface unit IF-2 is powered off (step S523) for shifting to the cellular interface unit IF-1 (step S502).

In the fifth embodiment, as is the case with the above embodiments, the power saving is achieved in the communication terminal apparatus 4; the reliability of communication is improved; and a contribution can be made to the economical communication.

Sixth Embodiment

Figure 44:
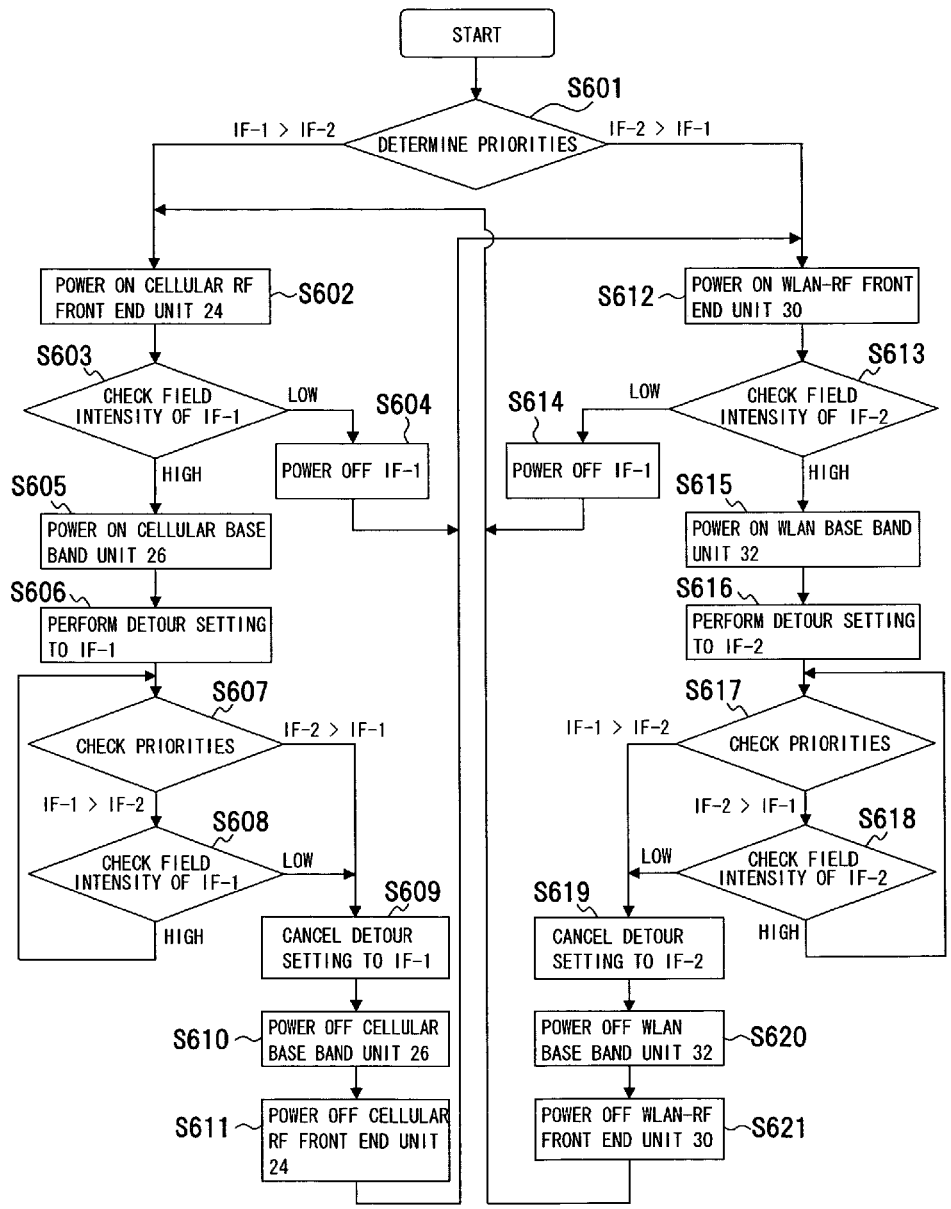
FIG. 44 is a flowchart of a process procedure of the communication terminal apparatus in a communication system according to a sixth embodiment.

A sixth embodiment of the present invention will be described with reference to FIG. 44. FIG. 44 is a flowchart of a process procedure of the communication terminal apparatus.

In the process shown in the sixth embodiment, as is the case with the fourth embodiment (FIG. 37), the cellular RF front end unit 24 and the cellular base band unit 26 are separately supplied with power; the WLAN-RF front end unit 30 and the WLAN base band unit 32 are separately supplied with power as well; and while considering the switch control thereof, the priorities are set for selecting the operation of the cellular interface unit IF-1 and the WLAN interface unit IF-2. This process is executed by the communication control program 62 or modifications thereof.

The sixth embodiment also uses the communication system 2 shown in FIG. 1, the communication terminal apparatus 4 shown in FIG. 37 (the fourth embodiment), the program/data storage memory 46 shown in FIG. 3, the cellular switchboard 10 shown in FIG. 5, the program/data storage memory 78 shown in FIG. 6, the SIP server 14 shown in FIG. 7, and the program/data storage memory 92 shown in FIG. 8.

In this process, the priorities to be used are determined for the cellular interface unit IF-1 and the WLAN interface unit IF-2 by specification from a user or system conditions (step S601), and if the priority of the cellular interface unit IF-1 is higher, the cellular RF front end unit 24 of the cellular interface unit IF-1 is powered on (step S602). The field intensity of the cellular interface unit IF-1 is checked (step S603); if the field intensity is low, the cellular interface unit IF-1 is powered off (step S604); and if the field intensity is high, the cellular base band unit 26 is powered on (step S605). The detour setting to the cellular interface unit IF-1 is performed (step S606); the priorities of the cellular interface unit IF-1 and the WLAN interface unit IF-2 are checked in this state (step S607); if the priority of the cellular interface unit IF-1 is higher, the field intensity of the cellular interface unit IF-1 is checked (step S608); and if the field intensity is high, the current state is maintained (steps S607, 608).

When the priority of the WLAN interface unit IF-2 is higher in the priority check of the cellular interface unit IF-1 and the WLAN interface unit IF-2 (step S607), if the field intensity is low in the field intensity check of the cellular interface unit IF-1 (step S608), the detour setting to the cellular interface unit IF-1 is cancelled (step S609); the cellular base band unit 26 is powered off (step S610); and the cellular RF front end unit 24 is powered off (step S611) for shifting to the WLAN interface unit IF-2 (step S612).

When the WLAN interface unit IF-2 is selected in the priority determining process for the cellular interface unit IF-1 and the WLAN interface unit IF-2 (step S601), if the cellular interface unit IF-1 is powered off (steps S604, S611) the WLAN-RF front end unit 30 is powered on (step S612) and the field intensity of the WLAN interface unit IF-2 is checked (step S613), and if the field intensity is low, the WLAN interface unit IF-2 is powered off (step S614) and the procedure goes to step S602.

If the field intensity of the WLAN interface unit IF-2 is high, the WLAN base band unit 32 is powered on (step S615); the detour setting to the WLAN interface unit IF-2 is performed (step S616); and the priorities of the cellular interface unit IF-1 and the WLAN interface unit IF-2 are checked in this state (step S617). If the priority of the WLAN interface unit IF-2 is higher than the cellular interface unit IF-1, the field intensity of the WLAN interface unit IF-2 is checked (step S618), and if the field intensity is high, the current setting is maintained (steps S617, 618).

When the priority of the cellular interface unit IF-1 is higher in the priority check of the cellular interface unit IF-1 and the WLAN interface unit IF-2 (step S617), if the field intensity is low in the field intensity check of the WLAN interface unit IF-2 (step S618), the detour setting to the WLAN interface unit IF-2 is cancelled (step S619); the WLAN base band unit 32 is powered off (step S620); and the WLAN-RF front end unit 30 is powered off (step S621) for shifting to the cellular interface unit IF-1 (step S602).

In the sixth embodiment, as is the case with the above embodiments, the power saving is achieved in the communication terminal apparatus 4; the reliability of communication is improved; and a contribution can be made to the economical communication.

Seventh Embodiment

Figure 45:
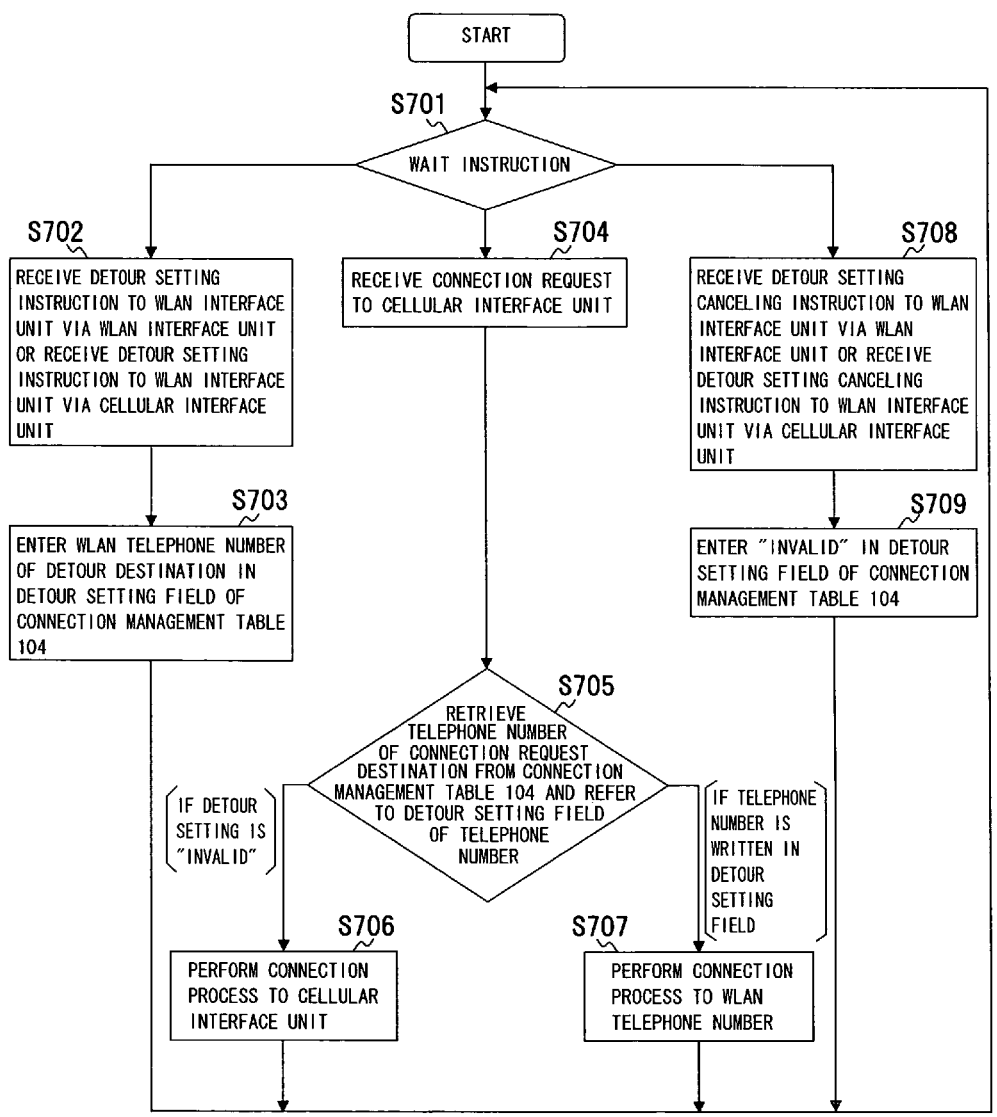
FIG. 45 is a flowchart of a process procedure of the cellular switchboard (in the case of powering off IF-1) in a communication system according to a seventh embodiment.
Figure 46:
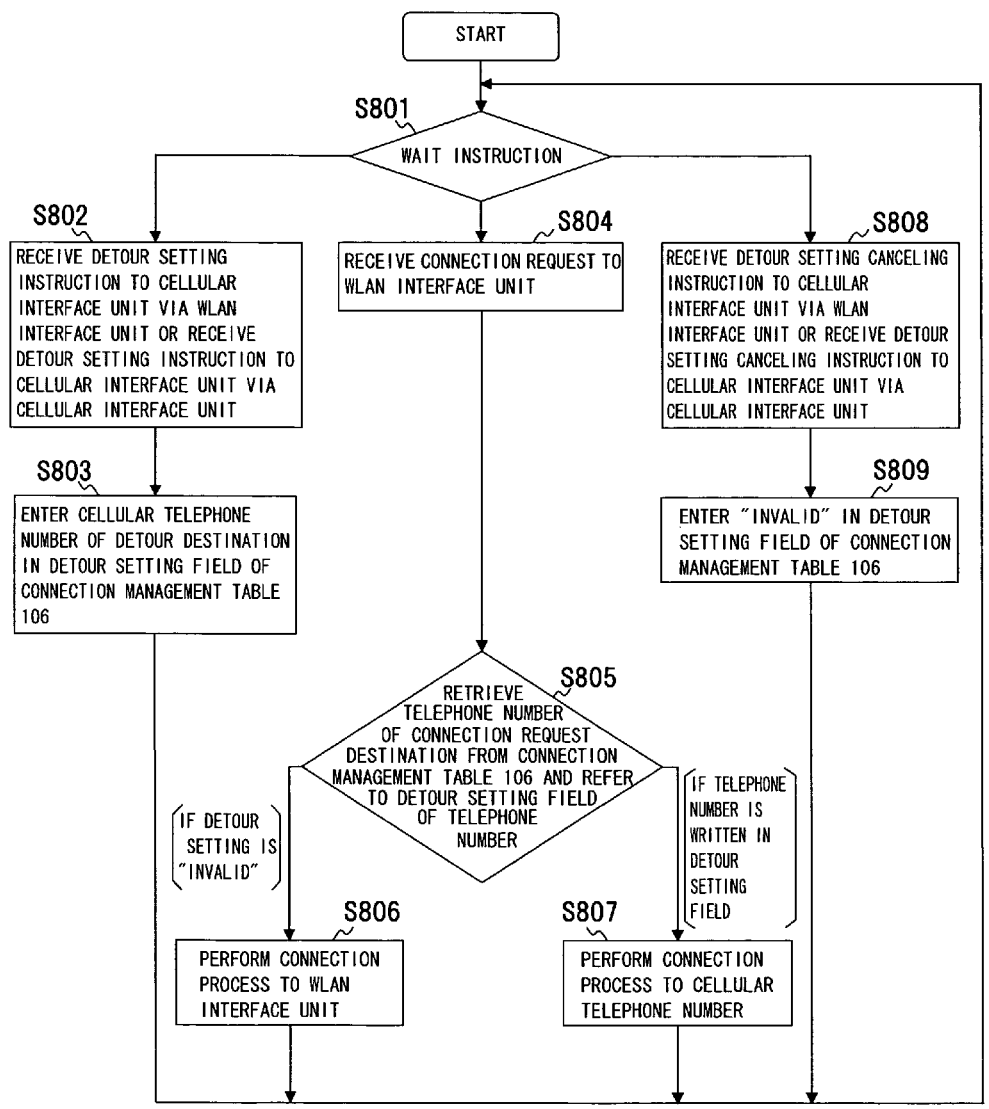
FIG. 46 is a flowchart of a process procedure of the SIP server (in the case of powering off IF-2)

A seventh embodiment of the present invention will be described with reference to FIGS. 45 and 46. FIG. 45 is a flowchart of a process procedure of the cellular switchboard 10 when powering off the cellular interface unit IF-1 and FIG. 46 is a flowchart of a process procedure of the SIP server 14 when powering off the WLAN interface unit IF-2.

The seventh embodiment is the detour setting or setting cancellation process when using the connection management table 104 in the cellular switchboard 10 and the connection management table 106 in the SIP server 14. The process is executed by the communication control program of the cellular switchboard 10.

The seventh embodiment also uses the communication system 2 shown in FIG. 1, the communication terminal apparatus 4 shown in FIG. 2, the program/data storage memory 46 shown in FIG. 3, the cellular switchboard 10 shown in FIG. 5, the program/data storage memory 78 shown in FIG. 6, the SIP server 14 shown in FIG. 7, and the program/data storage memory 92 shown in FIG. 8.

A. Case of Powering Off Cellular Interface Unit IF-1

As shown in FIG. 45, in the instruction waiting state of the communication terminal apparatus 4, the cellular switchboard 10 receives the next instruction (step S701) The instruction contents are steps S702, S704, and S708.

If the detour setting instruction to the WLAN interface unit IF-2 is received via the WLAN interface unit IF-2 or if the detour setting instruction to the WLAN interface unit IF-2 is received via the cellular interface unit IF-1 (step S702), a WLAN telephone number is entered in the detour setting field of the connection management table 104 (step S703).

If the connection request to the cellular interface unit IF-1 is received (step S704), a telephone number of the connection request destination is retrieved from the connection management table 104 and the detour setting field of the telephone number is referenced (step S705). If the detour setting is invalid, a connection process to the cellular interface unit IF-1 is performed without performing the detouring to the WLAN network 8 (step S706). If a telephone number is written in the detour setting field, a connection process to the WLAN telephone number is performed (step S707).

If the detour setting canceling instruction to the WLAN interface unit IF-2 is received via the WLAN interface unit IF-2 or if the detour setting canceling instruction to the WLAN interface unit IF-2 is received via the cellular interface unit IF-1 (step S708), "invalid" is entered in the detour setting field of the connection management table 104 (step S709).

B. Powering Off WLAN Interface Unit IF-2

As shown in FIG. 46, in the instruction waiting state of the communication terminal apparatus 4, the SIP server 14 receives the next instruction (step S801). The instruction contents are steps S802, S804, and S808.

If the detour setting instruction to the cellular interface unit IF-1 is received via the WLAN interface unit IF-2 or if the detour setting instruction to the cellular interface unit IF-1 is received via the cellular interface unit IF-1 (step S802), a cellular telephone number of the detour destination is entered in the detour setting field of the connection management table 106 (step S803).

If the connection request to the WLAN interface unit IF-2 is received (step S804), a telephone number of the connection request destination is retrieved from the connection management table 106 and the detour setting field of the telephone number is referenced (step S805). If the detour setting is invalid, a connection process to the WLAN interface unit IF-2 is performed without performing the detouring to the cellular network 6 (step S806). If a telephone number is written in the detour setting field, a connection process to the cellular telephone number is performed (step S807).

If the detour setting canceling instruction to the cellular interface unit IF-1 is received via the WLAN interface unit IF-2 or if the detour setting canceling instruction to the cellular interface unit IF-1 is received via the cellular interface unit IF-1 (step S808), "invalid" is entered in the detour setting field of the connection management table 106 (step S809).

Eighth Embodiment

Figure 47:
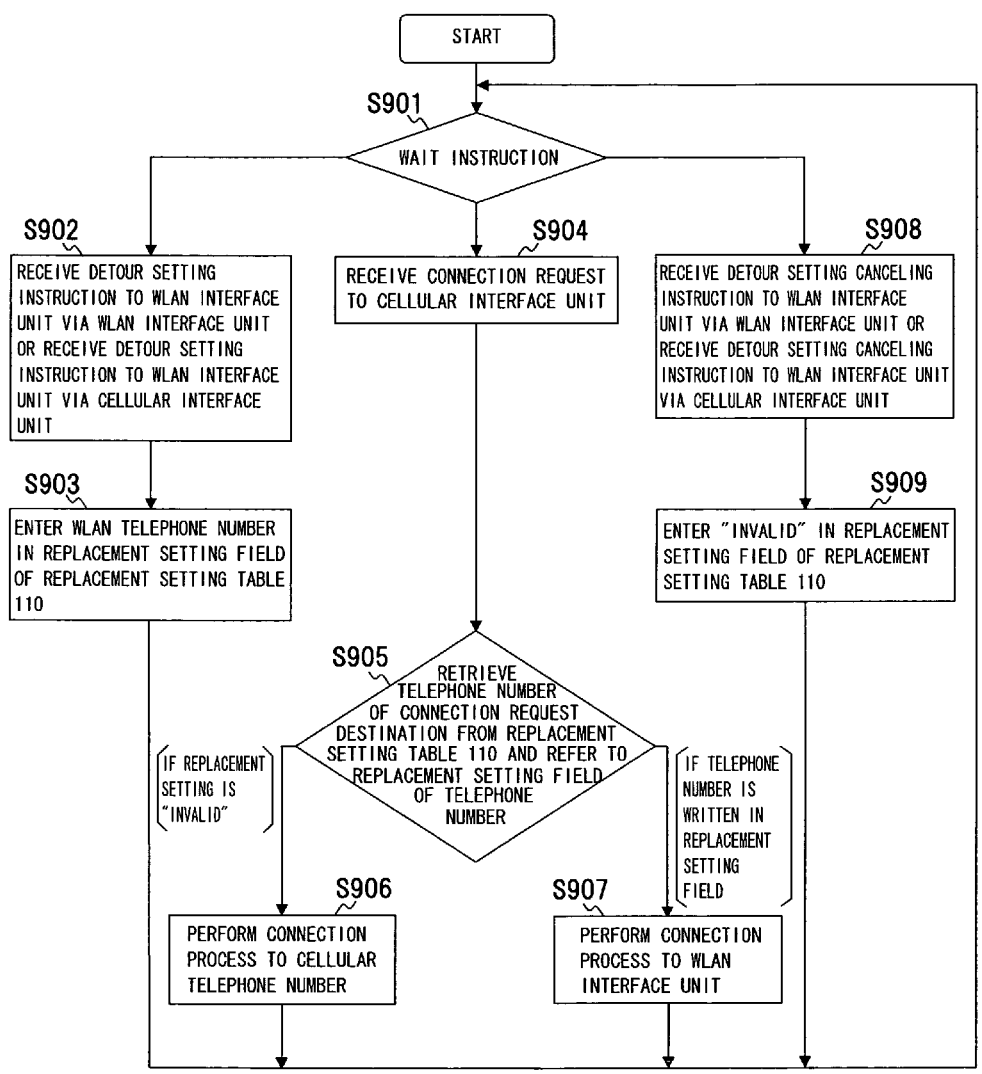
FIG. 47 is a flowchart of a process procedure of the SIP server (in the case of powering off IF-1) in a communication system according to an eighth embodiment.
Figure 48:
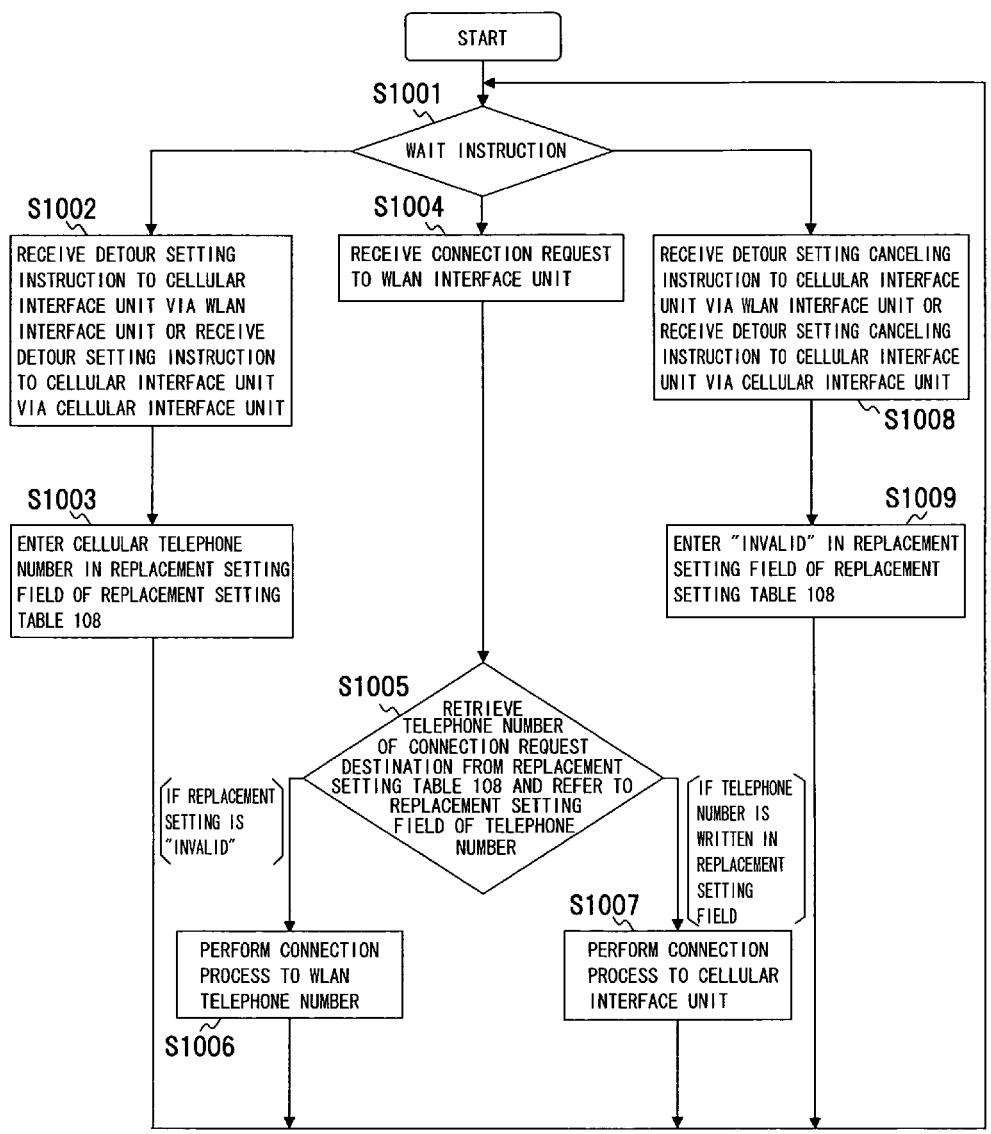
FIG. 48 is a flowchart of a process procedure of the cellular switchboard (in the case of powering off IF-2)

An eighth embodiment of the present invention will be described with reference to FIGS. 47 and 48. FIG. 47 is a flowchart of a process procedure of the SIP server 14 when powering off the cellular interface unit IF-1 and FIG. 48 is a flowchart of a process procedure of the cellular switchboard 10 when powering off the WLAN interface unit IF-2.

The eighth embodiment is the detour setting or setting cancellation process when using the replacement setting table 108 in the cellular switchboard 10 and the replacement setting table 110 in the SIP server 14. The process is executed by the communication control program of the SIP server 14.

The eighth embodiment also uses the communication system 2 shown in FIG. 1, the communication terminal apparatus 4 shown in FIG. 2, the program/data storage memory 46 shown in FIG. 3, the cellular switchboard 10 shown in FIG. 5, the program/data storage memory 78 shown in FIG. 6, the SIP server 14 shown in FIG. 7, and the program/data storage memory 92 shown in FIG. 8.

A. Case of Powering Off Cellular Interface Unit IF-1

As shown in FIG. 47, in the instruction waiting state of the communication terminal apparatus 4, the SIP server 14 receives the next instruction (step S901). The instruction contents are steps S902, S904, and S908.

If the detour setting instruction to the WLAN interface unit IF-2 is received via the WLAN interface unit IF-2 or if the detour setting instruction to the WLAN interface unit IF-2 is received via the cellular interface unit IF-1 (step S902), a WLAN telephone number is entered in the replacement setting field of the replacement setting table 110 (step S903).

If the connection request to the cellular interface unit IF-1 is received (step S904), a telephone number of the connection request destination is retrieved from the replacement setting table 110 and the replacement setting field of the telephone number is referenced (step S905). If the replacement setting is invalid, a connection process to the cellular telephone number is performed (step S906). If a telephone number is written in the replacement setting field, a connection process to the WLAN interface unit IF-2 written in the replacement setting field is performed without performing the detouring to the cellular network 6 (step S907).

If the detour setting canceling instruction to the WLAN interface unit IF-2 is received via the WLAN interface unit IF-2 or if the detour setting canceling instruction to the WLAN interface unit IF-2 is received via the cellular interface unit IF-1 (step S908), "invalid" is entered in the replacement setting field of the replacement setting table 110 (step S909).

B. Powering Off WLAN Interface Unit IF-2

As shown in FIG. 48, in the instruction waiting state of the communication terminal apparatus 4, the cellular switchboard 10 receives the next instruction (step S1001). The instruction contents are steps S1002, S1004, and S1008.

If the detour setting instruction to the cellular interface unit IF-1 is received via the WLAN interface unit IF-2 or if the detour setting instruction to the cellular interface unit IF-1 is received via the cellular interface unit IF-1 (step S1002), a cellular telephone number is entered in the replacement setting field of the replacement setting table 108 (step S1003).

If the connection request to the WLAN interface unit IF-2 is received (step S1004), a telephone number of the connection request destination is retrieved from the replacement setting table 108 and the replacement setting field of the telephone number is referenced (step S1005) If the detour setting is invalid, a connection process to the WLAN telephone number is performed (step S1006). If a telephone number is written in the replacement setting field, a connection process to the cellular interface unit IF-1 is performed without performing the detouring to the WLAN network 8 (step S1007).

If the detour setting canceling instruction to the cellular interface unit IF-1 is received via the WLAN interface unit IF-2 or if the detour setting canceling instruction to the cellular interface unit IF-1 is received via the cellular interface unit IF-1 (step S1008), "invalid" is entered in the replacement setting field of the replacement setting table 108 (step S1009).

In such a configuration, as is the case with the above embodiments, the power saving is achieved in the communication terminal apparatus 4; the reliability of communication is improved; and a contribution can be made to the economical communication.

Figure 49:
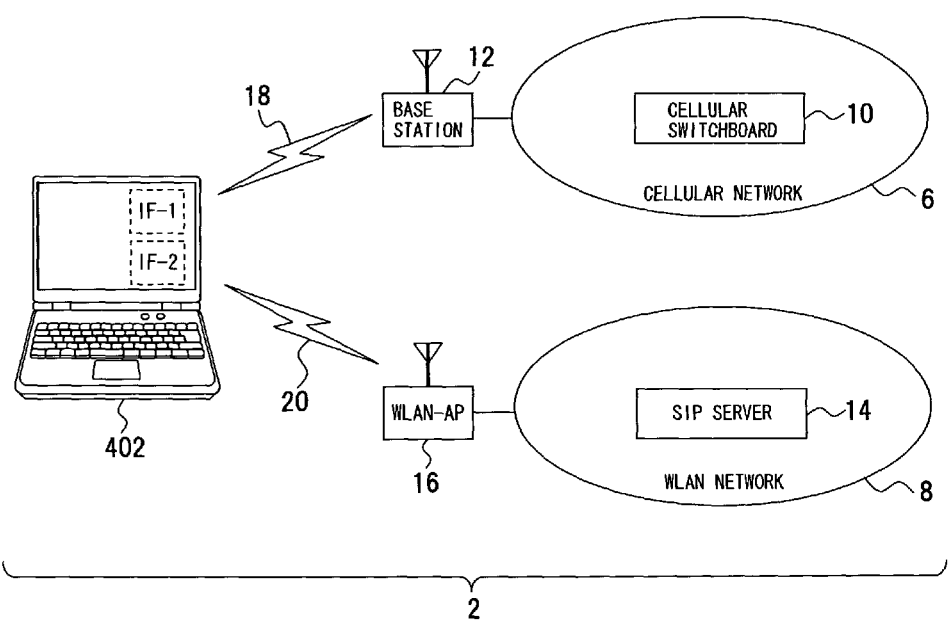
FIG. 49 depicts a communication system according to another embodiment.
Figure 50:
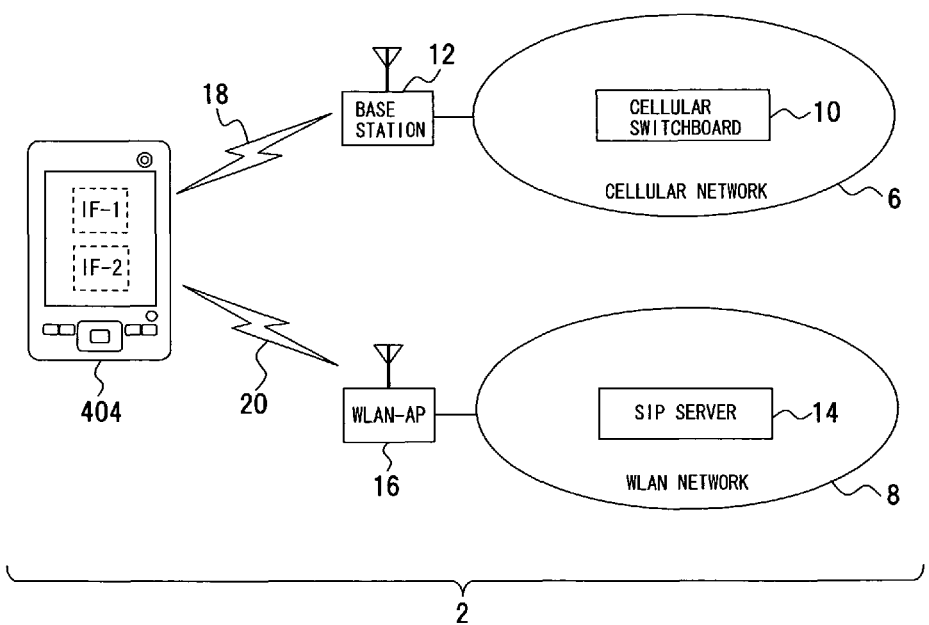
FIG. 50 depicts a communication system according to another embodiment.

Other Embodiments (1) Although the communication terminal apparatus 4 is illustrated as a communication apparatus in the above embodiments, the present invention can be applied to any communication apparatuses as long as the cellular interface unit IF-1 and the WLAN interface unit IF-2 are included to enable communication with a plurality of communication networks and, for example, as shown in FIG. 49, the communication system 2 may include a personal computer (PC) 402 disposed with the cellular interface unit IF-1 and the WLAN interface unit IF-2 for the communication function or, as shown in FIG. 50, the communication system 2 may include a personal digital assistant (PDA) 404 with the same function.

(2) Although the communication terminal apparatus 4, PC 402, PDA 404, etc., including the cellular interface unit IF-1 and the WLAN interface unit IF-2 are illustrated as communication apparatuses in the above embodiments, the power source switching may be performed for three or more interface units including interface units corresponding to other communication networks, for example, WiMAX, in addition to the so-called DUAL terminals with the combined communication function.

Although the most preferred embodiment, etc., of the present invention has been described as above, the present invention is not limited to the above description; it is obvious that various modifications and changes can be made by those skilled in the art based on the gist of the present invention disclosed in the specification; and it is needless to say that such modifications and changes are within the range of the present invention.

The present invention is useful since the present invention can select a plurality of interface units, can support the power saving due to the switching of the connection of the power source for the interface units, the detour call reception corresponding to the power source switching for the interface units, and the selection conditions such as the priority selection of the field intensity and fee conditions, can contribute to the maintenance of the communication reliability and the improvement in the economical efficiency, and enables automatic selection, etc. of the interface units.

What is claimed is:

1. A communication apparatus wirelessly connected to a plurality of networks to handle a call to and from one of the networks, the apparatus comprising:
   a plurality of interface units each of which includes a front end unit that transmits and receives electric waves and a base band unit that processes call transmission and reception information for the corresponding front end unit, and each of the interface units is associated with a corresponding network of the plurality of the networks;
   a power source that separately supplies power to the front end units and the base band units of the plurality of interface units, wherein the call is handled by a first interface unit of the plurality of interfaces units;
   a controlling unit configured to:
   control the power source to supply power to each of the front end unit periodically to enable the controlling unit detect and evaluate field intensity for each of the front end units using predetermined criteria;
   connect the power source to a base band unit of a selected interface unit that is different than the first interface unit that handles the call based on a evaluation result of the field intensity to designate the selected interface unit function as a new call destination interface for incoming call data of the call, and in turn disconnect the power source from the remaining base band units of other interface units to suspend the other interface units; and
   the controlling unit is further configured to facilitate a detour for incoming call data to the new destination interface unit by:
   via the first network interface unit, sending detour information for the call to the network associated with the first network interface unit prior to the first network interface unit being powered off, wherein the detour information comprises the selected network interface unit's destination address that is configured to cause the network to detour future incoming call data to the selected network interface unit.

2. The communication apparatus of claim 1, wherein the interface unit of the call destination is selected based on priorities set in advance or as needed.

3. A method for a communication apparatus wirelessly connected to a plurality of networks to handle a call to and from one of the networks, the method comprising
   operating a plurality of interface units each of which includes a front end unit that transmits and receives electric waves and a base band unit that processes call transmission and reception information for the corresponding front end unit, and each of the interface units is associated with a corresponding network of the plurality of the networks;
   operating a power source that separately supplies power to the front end units and the base band units of the plurality of interface units, wherein the call is handled by a first interface unit of the plurality of interfaces units;
   controlling, by a controlling unit, the power source to supply power to each of the front end unit periodically to enable the controlling unit detect and evaluate field intensity for each of the front end units using predetermined criteria;
   connecting the power source to a base band unit of a selected interface unit that is different than the first interface unit that handles the call based on an evaluation result of the field intensity to designate the selected interface unit function as a new call destination interface for incoming call data of the call, and in turn disconnecting the power source from the remaining base band units of other interface units to suspend the other interface units; and
   facilitating a detour for incoming call data to the new destination interface unit by:
   via the first network interface unit, sending detour information for the call to the network associated with the first network interface unit prior to the first network interface unit being powered off, wherein the detour information comprises the selected network interface unit's destination address that is configured to cause the network to detour future incoming call data to the selected network interface unit.

4. The communication method of claim 3, wherein the new destination interface unit is selected based on priorities set in advance or as needed.

5. A non-transitory computer readable recording medium that stores a communication program, the recording medium storing the communication program executed by a computer to perform:
   operating a plurality of interface units each of which includes a front end unit that transmits and receives electric waves and a base band unit that processes call transmission and reception information for the corresponding front end unit, and each of the interface units is associated with a corresponding network of the plurality of the networks;
   operating a power source that separately supplies power to the front end units and the base band units of the plurality of interface units, wherein the call is handled by a first interface unit of the plurality of interfaces units;
   controlling, by a controlling unit, the power source to supply power to each of the front end unit periodically to enable the controlling unit detect and evaluate field intensity for each of the front end units using predetermined criteria;

connecting the power source to a base band unit of a selected interface unit that is different than the first interface unit that handles the call based on an evaluation result of the field intensity to designate the selected interface unit function as a new call destination interface for incoming call data of the call, and in turn disconnecting the power source from the remaining base band units of other interface units to suspend the other interface units; and facilitating a detour for incoming call data to the new destination interface unit by:

via the first network interface unit, sending detour information for the call to the network associated with the first network interface unit prior to the first network interface unit being powered off, wherein the detour information comprises the selected network interface unit's destination address that is configured to cause the network to detour future incoming call data to the selected network interface unit.

* * * * *